(12) United States Patent
Corban et al.

(10) Patent No.: US 11,818,982 B2
(45) Date of Patent: Nov. 21, 2023

(54) GRAIN QUALITY CONTROL SYSTEM AND METHOD

(71) Applicants: Deere & Company, Moline, IL (US); Carnegie Mellon University, Pittsburgh, PA (US)

(72) Inventors: Stephen R. Corban, East Moline, IL (US); Scott Miller, Ankeny, IA (US); William D. Todd, Bettendorf, IA (US); Herman Herman, Gibsonia, PA (US); Zachary Pezzementi, Pittsburgh, PA (US); Trenton Tabor, Pittsburgh, PA (US); Jonathan Chang, Laurel, MD (US)

(73) Assignees: DEERE & COMPANY, Moline, IL (US); CARNEGIE MELLON UNIVERSITY, Pittsburgh, PA (US)

( * ) Notice: Subject to any disclaimer, the term of this patent is extended or adjusted under 35 U.S.C. 154(b) by 804 days.

(21) Appl. No.: 16/540,562

(22) Filed: Aug. 14, 2019

(65) Prior Publication Data

US 2020/0084967 A1 Mar. 19, 2020

Related U.S. Application Data

(60) Provisional application No. 62/732,779, filed on Sep. 18, 2018.

(51) Int. Cl.
*A01D 75/18* (2006.01)
*A01D 41/127* (2006.01)
(Continued)

(52) U.S. Cl.
CPC ......... *A01D 41/1277* (2013.01); *A01D 41/06* (2013.01); *A01D 45/30* (2013.01);
(Continued)

(58) Field of Classification Search
CPC .. A01D 41/06; A01D 41/1277; A01D 43/085; A01D 45/30; A01D 61/02;
(Continued)

(56) References Cited

U.S. PATENT DOCUMENTS 6,053,811 A 4/2000 Johnson et al.
6,342,006 B1 * 1/2002 Bauch ..................... A01F 12/52
73/579

(Continued)

FOREIGN PATENT DOCUMENTS

EP 2570968 A2 3/2013
WO 2013012080 A1 1/2013

OTHER PUBLICATIONS

Ex parte Quayle Office Action issued in Utility U.S. Appl. No. 16/540,553 on Aug. 9, 2021. (14 pages).
(Continued)

*Primary Examiner* — Md N Haque
(74) *Attorney, Agent, or Firm* — KLINTWORTH & ROZENBLAT IP LLP

(57) ABSTRACT

A grain tailings elevator for a combine harvester includes a an elevator housing having an interior containing a conveyor arrangement configured to transport grain tailings through the elevator housing to a discharge outlet. The elevator housing has a side wall with a window to the interior of the elevator housing. A camera having a camera housing containing an image sensor is mounted to the side wall of the elevator housing over the window with the image sensor in registration with the window. The image sensor is trained on the conveyor arrangement and configured to image the grain tailings transported by the conveyor arrangement through the elevator housing.

14 Claims, 10 Drawing Sheets

(51) Int. Cl.

| | | |
|---|---|---|
| *A01D 41/06* | (2006.01) | |
| *A01D 45/30* | (2006.01) | |
| *A01D 61/02* | (2006.01) | |
| *G06T 7/00* | (2017.01) | |
| *A01F 12/46* | (2006.01) | |
| *G01N 21/85* | (2006.01) | |
| *H04N 23/51* | (2023.01) | |
| *H04N 23/54* | (2023.01) | |
| *H04N 23/80* | (2023.01) | |
| *G06V 10/764* | (2022.01) | |
| *G06V 10/82* | (2022.01) | |
| *G06V 20/66* | (2022.01) | |
| *A01D 43/08* | (2006.01) | |
| *G06V 20/68* | (2022.01) | |

(52) U.S. Cl.
CPC .............. *A01D 61/02* (2013.01); *A01F 12/46* (2013.01); *G01N 21/85* (2013.01); *G06T 7/0002* (2013.01); *G06V 10/764* (2022.01); *G06V 10/82* (2022.01); *G06V 20/66* (2022.01); *H04N 23/51* (2023.01); *H04N 23/54* (2023.01); *H04N 23/80* (2023.01); *A01D 43/085* (2013.01); *G01N 2021/8592* (2013.01); *G06T 2207/30188* (2013.01); *G06V 20/68* (2022.01)

(58) Field of Classification Search
CPC ........... A01F 12/46; G06T 2207/30188; G06T 7/0002; G01N 2021/8466; G01N 2021/8592; G01N 21/85
See application file for complete search history.

(56) References Cited

U.S. PATENT DOCUMENTS

| | | | |
|---|---|---|---|
| 7,630,809 B2 | 12/2009 | Behnke et al. | |
| 7,877,969 B2 | 2/2011 | Behnke | |
| 7,953,264 B2 | 5/2011 | Levenson et al. | |
| 8,045,168 B2 | 10/2011 | Missotten et al. | |
| 9,516,817 B2 | 12/2016 | Temple et al. | |
| 9,560,802 B1 | 2/2017 | Palla et al. | |
| 9,648,807 B2 | 5/2017 | Escher et al. | |
| 9,779,330 B2 | 10/2017 | Wellington et al. | |
| 9,901,031 B2 | 2/2018 | Mott et al. | |
| 10,188,036 B2 | 1/2019 | Loukili et al. | |
| 10,989,833 B2 | 3/2021 | Ferren et al. | |
| 2004/0031335 A1 | 2/2004 | Fromme et al. | |
| 2004/0141641 A1 | 7/2004 | McDonald, Jr. et al. | |
| 2004/0186597 A1 | 9/2004 | Wippersteg et al. | |
| 2009/0125197 A1 | 5/2009 | Behnke | |
| 2009/0291723 A1 | 11/2009 | Missotten | |
| 2009/0297040 A1 | 12/2009 | Missotten et al. | |
| 2010/0121541 A1 | 5/2010 | Behnke et al. | |
| 2012/0004815 A1* | 1/2012 | Behnke | A01D 41/1277 701/50 |
| 2014/0019018 A1 | 1/2014 | Baumgarten et al. | |
| 2014/0050364 A1* | 2/2014 | Brueckner | G06V 10/56 382/110 |
| 2015/0009328 A1* | 1/2015 | Escher | A01D 41/1273 348/148 |
| 2015/0293507 A1 | 10/2015 | Burns et al. | |
| 2015/0370935 A1 | 12/2015 | Starr | |
| 2016/0081271 A1 | 3/2016 | Mott et al. | |
| 2016/0189007 A1* | 6/2016 | Wellington | G06V 10/42 382/110 |
| 2017/0094901 A1 | 4/2017 | French, Jr. et al. | |
| 2017/0112057 A1* | 4/2017 | Loukili | A01D 41/1277 |
| 2017/0200260 A1 | 7/2017 | Bhaskar et al. | |
| 2017/0311543 A1 | 11/2017 | Leenknegt et al. | |
| 2018/0000011 A1* | 1/2018 | Schleusner | A01D 41/1271 |
| 2018/0106709 A1 | 4/2018 | Cherney | |
| 2018/0271015 A1* | 9/2018 | Redden | G06N 3/006 |
| 2019/0073759 A1 | 3/2019 | Hadar et al. | |
| 2019/0228224 A1 | 7/2019 | Guo et al. | |
| 2019/0274254 A1* | 9/2019 | Banks, Jr. | A01F 12/52 |
| 2020/0084967 A1 | 3/2020 | Corban et al. | |
| 2020/0134392 A1 | 4/2020 | Gui et al. | |

OTHER PUBLICATIONS

Aayush Bansal et al., PixelNet: Representation of the Pixels, by the Pixels, and for the Pixels, http://www.cs.cmu.edu/aayushb/pixelNet/, arXiv:1702.06506v1 [cs.CV] Feb. 21, 2017.

Aayush Bansal et al., PixelNet: Towards a General Pixel-Level Architecture, http://www.cs.cmu.edu/aayushb/pixelNet/, arXiv:1609.06694v1 [cs.CV] Sep. 21, 2016.

Case IH Agriculture, Axial-Flow 250 Series Brochure, AFS Harvest Command, Oct. 2018. (77 pages).

German Office Action issued in application No. 102019214038.6 filed on Sep. 16, 2019 (04 pages). German application No. 102019214038.6 is a foreign counterpart patent application to the present patent application, i.e., U.S. Appl. No. 16/540,562.

* cited by examiner

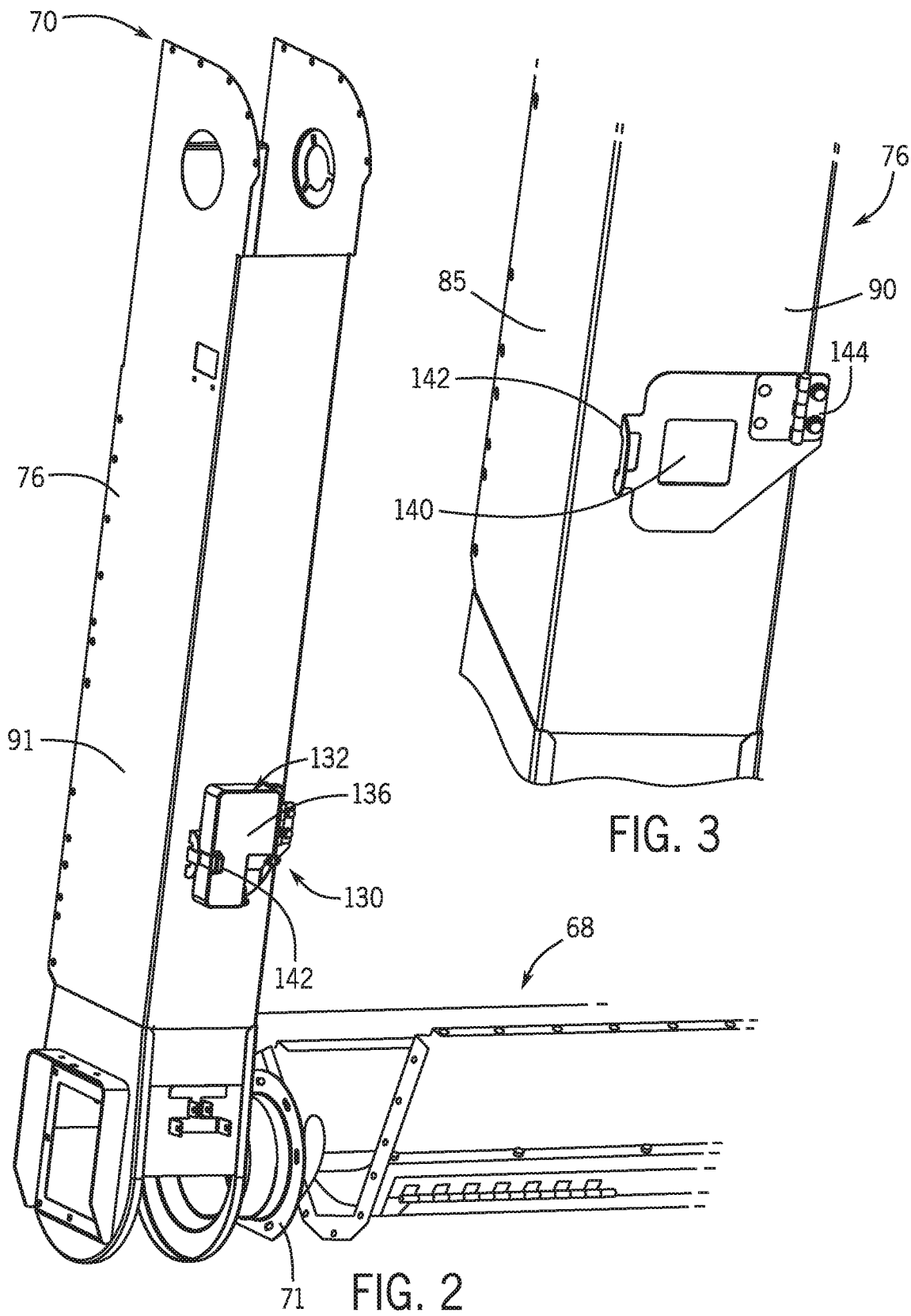

GRAIN QUALITY CONTROL SYSTEM AND METHOD

CROSS-REFERENCE TO RELATED APPLICATION(S)

This application claims priority to U.S. provisional application No. 62/732,779, filed Sep. 18, 2018.

STATEMENT OF FEDERALLY SPONSORED RESEARCH OR DEVELOPMENT

Not applicable.

FIELD OF THE DISCLOSURE

This disclosure generally relates to agricultural combine harvesters, and more specifically to systems for improving the quality of grain harvested.

BACKGROUND OF THE DISCLOSURE

The value of bulk grain may depend upon the quality of the bulk grain. High quality grain is reflected by high percentages of clean unbroken grain and low percentages of broken grain and material other than grain (MOG). Monitoring the quality of bulk grain can be helpful in improving grain quality. Imaging and classifying the grain material can be an effective monitoring technique. Accurate classification is dependent in part on reliable sampling and imaging of the grains.

SUMMARY OF THE DISCLOSURE

The disclosure provides a grain quality control system and method for monitoring and controlling grain harvested by an agricultural combine harvester.

In one aspect, the disclosure provides a grain tailings elevator for a combine harvester. The grain tailings elevator has an elevator housing with an interior in which a conveyor arrangement that transports partially threshed grain tailings through the elevator housing to a discharge outlet. The elevator housing has a side wall with a window to the interior of the elevator housing. A camera has a camera housing containing an image sensor. The camera housing is mounted to the elevator housing over the window in the side wall with the image sensor in registration with the window. The image sensor is trained on the conveyor arrangement and images the grain tailings transported by the conveyor arrangement through the elevator housing.

In another aspect, the disclosure provides an agriculture combine including a clean grain elevator and a grain tailings elevator. The grain tailings elevator includes an elevator housing having an interior containing a conveyor arrangement configured to transport partially threshed grain tailings through the elevator housing to a discharge outlet. The elevator housing has a side wall with a window to the interior of the elevator housing. A camera, having a camera housing containing an image sensor, is mounted to the elevator housing over the window in the side wall with the image sensor in registration with the window. The image sensor is trained on the conveyor arrangement and configured to image the grain tailings transported by the conveyor arrangement through the elevator housing.

The details of one or more embodiments are set forth in the accompanying drawings and the description below. Other features and advantages will become apparent from the description, the drawings, and the claims.

BRIEF DESCRIPTION OF THE DRAWINGS

FIG. 2 is a perspective view of an example grain tailings elevator of the combine harvester of FIG. 1 for use with the grain quality control system;

FIG. 3 is a partial enlarged view of a portion of the grain tailings elevator of FIG. 2;

Like reference symbols in the various drawings indicate like elements.

DETAILED DESCRIPTION

Figure 1:
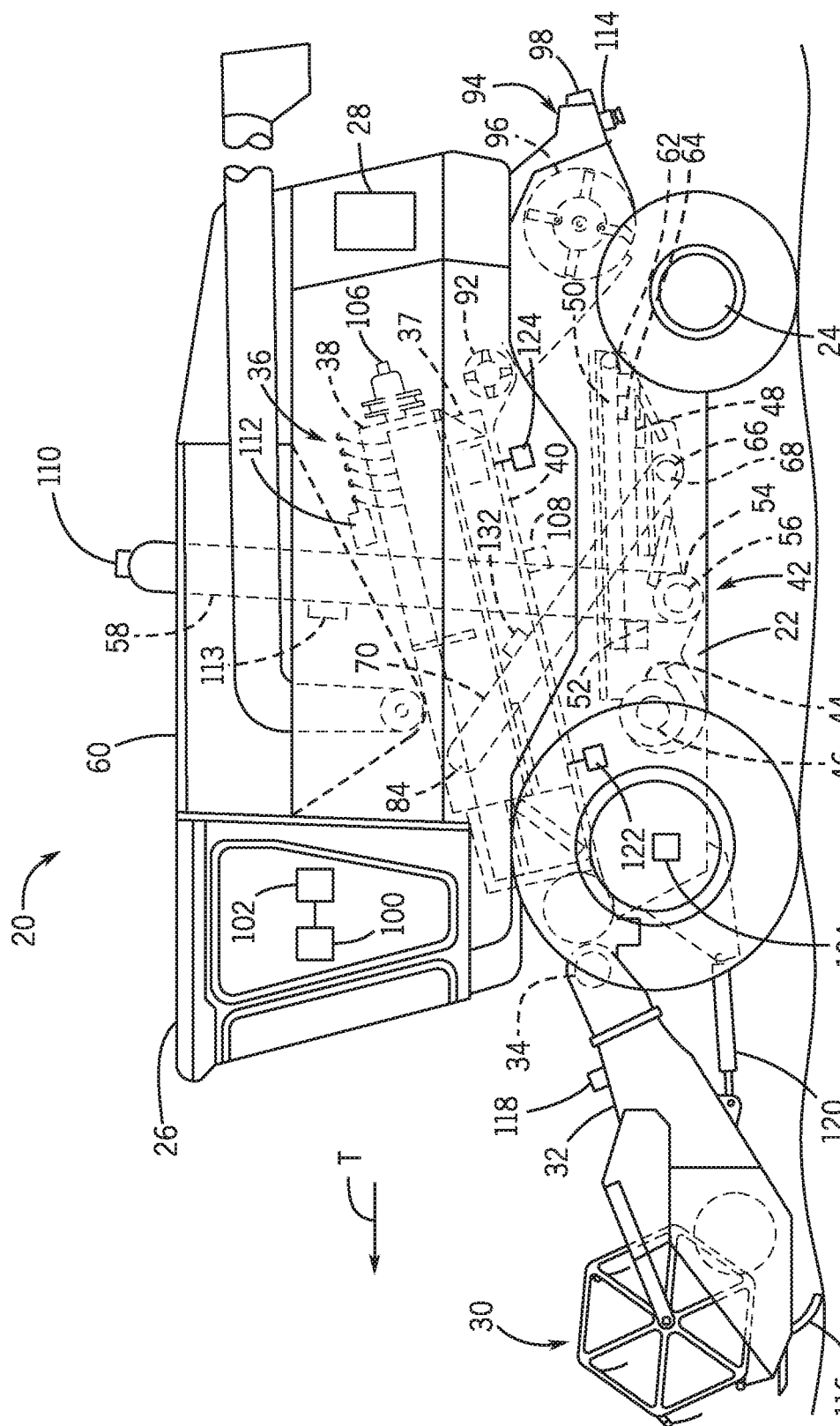
FIG. 1 is a schematic view of one example agricultural combine harvester including a grain quality control system according to this disclosure.

The following describes one or more example implementations of the disclosed grain quality control system and method, as shown in the accompanying figures of the drawings described briefly above. Various modifications to the example implementations may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction and orientation, such as "forward," "front," "aft," "rear," "lateral," "horizontal," and "vertical" may be used. Such terms are defined, at least in part, with respect to the direction in which the work vehicle or implement travels during use. For example, the terms "forward" and "front" (including "fore" and any further derivatives or variations) refer to a direction corresponding to the primary direction of travel, while the term "aft" and "rear" (and derivatives and variations) refer to an opposing direction. The term "longitudinal axis" may also reference an axis extending in fore and aft directions. By comparison, the term "lateral axis" may refer to an axis that is perpendicular to the longitudinal axis and extends in a horizontal plane; that is, a plane containing both the longitudinal and lateral axes. The term "vertical," as appearing herein, refers to an axis or a direction orthogonal to the horizontal plane containing the fore-aft and lateral axes.

The present disclosure provides an improved grain quality control system for use in agricultural combine harvesters to enhance the quality of the clean grain yield. The grain quality control system disclosed herein may be understood to both monitor the constituent components of the crop being harvested as it passes through the combine harvester as well as to actively control various operational parameters of the combine harvester based on an assessment of the quality of the monitored grain. Through the improved monitoring system and method disclosed herein, the machine control aspect of the system is better able to set machine parameters to produce higher clean grain yields.

In various embodiments, the grain quality control system monitors the harvested crop constituents using a vision or imaging system that includes one or more cameras or image sensors. The imaging system may thus visually interrogate the crop constituents at various locations along the flow of the crop through the combine harvester. The system and method described herein are not limited to the exact placement of the system or the area of interrogation.

In certain embodiments, the imaging is done during a transport-only portion of the crop flow through the combine harvester, which affords a better imaging environment as compared to other crop-processing areas. In various embodiments, the imaging is done at one or more grain elevators. As in conventional systems, imaging may be done at a bypass area or duct offshoot of a grain elevator, such as a clean grain elevator, in which clean grain is diverted to the bypass duct for imaging while traveling at a slower rate than while in the clean grain elevator itself.

The improved grain quality control system of this disclosure also affords visual interrogation of the crop being harvested by imaging the grain and/or chaff directly within a grain elevator, including the clean grain and/or grain tailings elevators. In various embodiments, as described in detail below, the disclosed grain quality control system may be configured with imaging hardware adapted to directly mount to a grain elevator, without the need for a bypass, to directly image the grain or non-grain material carried therein. By such direct mounting, and proper positioning of the hardware for better point-of-view inspection and coordination of image sampling relative to the elevator features and motion, the grain quality control system is capable of real-time imaging of the grain and chaff and analysis of the sample images to provide enhanced constituent part identification and classification.

In various embodiments, the image processing capabilities of the grain quality control system are enhanced (e.g., improved constituent part identification and classification) by improved logic architecture that incorporates deep-learning capabilities. The deep-learning aspect of the grain quality control system disclosed herein allows for improved system functionality and operation (e.g., increased processing speed, reduced processing load, higher sampling rates, and so on) as compared to conventional system. Various attributes of the deep-learning aspect of the image processing are detailed below.

Referring now to FIG. 1, a grain quality control system may be implemented with respect to an example agricultural combine harvester 20, or with respect to a variety of other agricultural combines. As depicted in FIG. 1, the example combine harvester 20 includes a chassis 22 with ground-engaging wheels 24 or tracks. The wheels 24 are rotatably mounted to the chassis 22 and engage with the ground to propel the combine harvester 20 in a travel direction T. An operator cab 26, also mounted to the chassis 22, houses an operator as well as various devices to control the combine 20. The wheels 24 and other devices of the combine 20 are powered by an internal combustion engine 28, alone or in combination with one or more electric machines (not shown).

A header 30 is mounted at the front of the combine harvester 20 to cut and gather crop material from a field. The header 30 is supported by a feederhouse 32, which is pivotally mounted to the chassis 22. The feederhouse 32 may include, for example, an inclined conveyor (not shown) for transport of cut crop material from the header 30 into the body of the combine harvester 20. After passing over a guide drum or feed accelerator 34, the crop material from the feederhouse 32 reaches a generally fore-aft oriented threshing device or separator 36. Other embodiments may include laterally oriented or other threshing devices (not shown). In the embodiment depicted, the separator 36 includes a rotor 38, on which various threshing elements are mounted. The rotor 38 rotates above one or more grated or sieved threshing baskets or concaves 40, such that crop material passing between the rotor 38 and the concave 40 is separated, at least in part, into grain and chaff (or other "material other than grain" (MOG)). The MOG is carried rearward and released from between the rotor 38 and the concave 40. Most of the grain (and some of the MOG) separated in the separator 36 falls downward through apertures in the concave 40. A separator loss sensor 37 senses grain loss in the separator 36 as separate grain-loss signals or a combined or aggregate signal.

Grain and MOG passing through the concaves 40 fall (or are actively fed) into a cleaning subsystem (or cleaning shoe) 42 for further cleaning. The cleaning subsystem 42 includes a fan 44, driven by a motor 46, that generates generally rearward air flow, as well as a sieve 48 and a chaffer 50. The sieve 48 and the chaffer 50 are suspended with respect to the chassis 22 by an actuation arrangement 52, which may include pivot arms and rocker arms mounted to disks (or other devices). As the fan 44 blows air across and through the sieve 48 and the chaffer 50, the actuation arrangement 52 may cause reciprocating motion of the sieve 48 and the chaffer 50 (e.g., via movement of the rocker arms). The combination of this motion of the sieve 48 and the chaffer 50 with the air flow from the fan 44 generally causes the lighter chaff to be blown upward and rearward within the combine harvester 20, while the heavier grain falls through the sieve 48 and the chaffer 50 and accumulates in a clean grain trough 54 near the base of the combine harvester 20. A clean grain auger 56 disposed in the clean grain trough 54 carries the material to one side of the combine harvester 20 and deposits the grain in the lower end of a clean grain elevator 58. The clean grain lifted by the clean grain elevator 58 is carried upward until it reaches the upper exit of the clean grain elevator 58. The clean grain is then released from the clean grain elevator 58 and falls into a grain tank 60.

Most of the grain entering the cleaning subsystem 42, however, is not carried rearward, but passes downward through the chaffer 50, then through the sieve 48. Of the material carried by air from the fan 44 to the rear of the sieve 48 and the chaffer 50, smaller MOG particles are blown out of the rear of the combine harvester 20. Larger MOG particles and grain are not blown off the rear of the combine harvester 20, but rather fall off the cleaning subsystem 42 and onto a shoe loss sensor 62 located to one side of the cleaning subsystem 42, which is configured to detect shoe losses on that side of the cleaning subsystem 42, and on a shoe loss sensor 64 located on the another side of the cleaning subsystem 42, which is configured to detect shoe losses on its side of the cleaning subsystem 42. Cleaning shoe loss sensors 62, 64 can provide output signals indicative of the quantity of grain loss at both the right and left sides of the cleaning subassembly 42. In one example, the sensors 62, 64 are strike sensors which count grain strikes per unit of time (or per unit of distance traveled) to provide an indication of the cleaning shoe grain loss in individual signals or a combined or aggregated signal.

Heavier material that is carried to the rear of the chaffer 50 falls out of the combine harvester 20 and can be partially detected by the cleaning shoe loss sensors 62, 64. Heavier material that is carried to the rear of the sieve 48 falls onto a pan and is then conveyed by gravity downward into a grain tailings trough 66. This heavier material is called "tailings" and is typically a mixture of grain and MOG. A tailings auger 68 is disposed in the tailings trough 66 and carries the grain tailings to the opposite side of the combine harvester 20 and into a grain tailings elevator 70.

The tailings elevator 70 may be constructed in a similar or different manner as the clean grain elevator 58 using any of various known transport mechanisms (e.g., augers, flighted belts, and so on). As the grain quality control system will be described herein as interrogating the grain tailings within the tailings elevator 70, only the construction of the example grain tailings elevator 70 will be detailed. It should be understood, however, that the principles of this disclosure could be used to interrogate the clean grain within the clean grain elevator 58, and further that such a grain quality control system may be incorporated therein.

Figure 4:
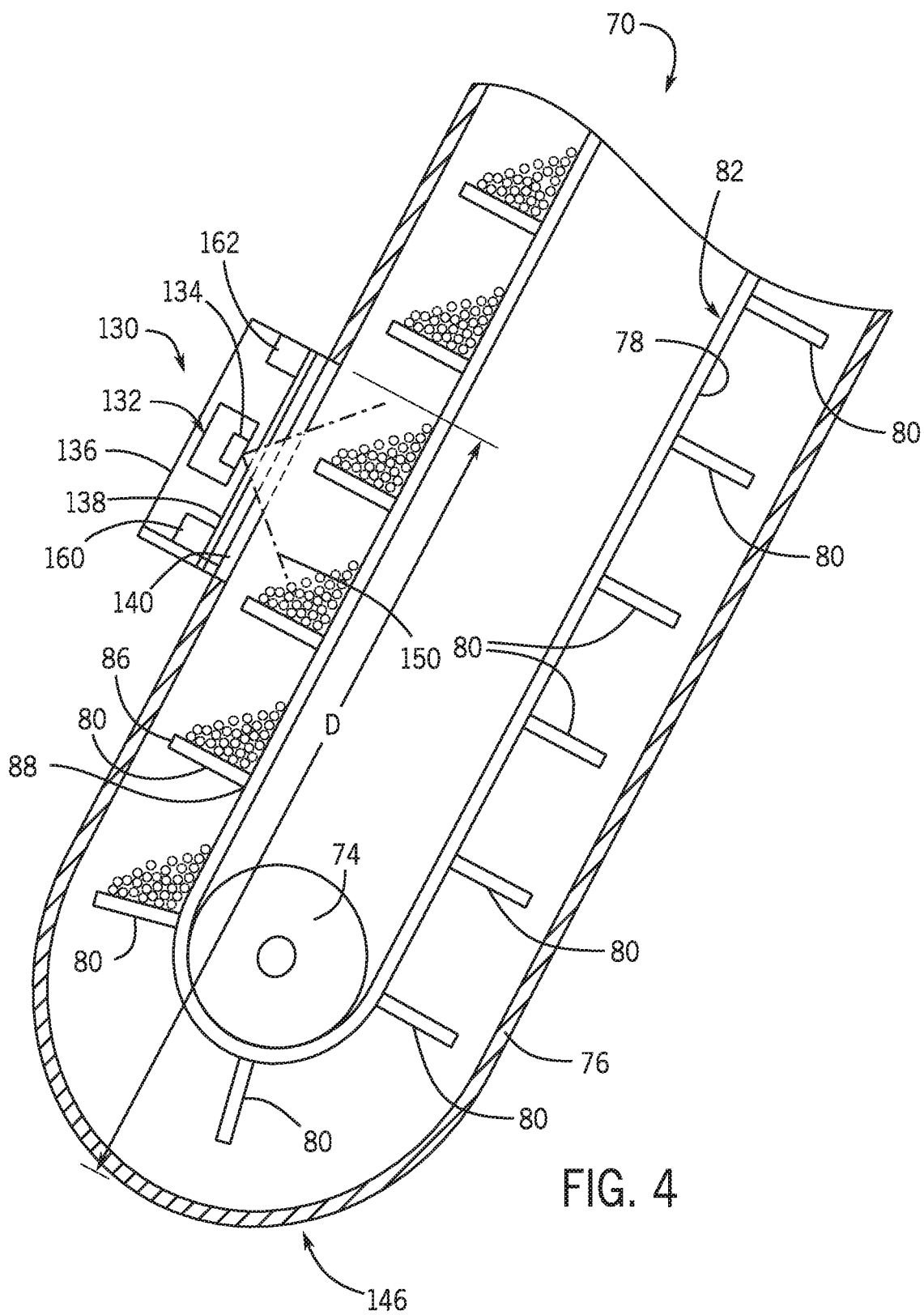
FIG. 4 is a simplified partial cross-sectional side view of the portion of the grain tailings elevator of FIG. 2.
Figure 5:
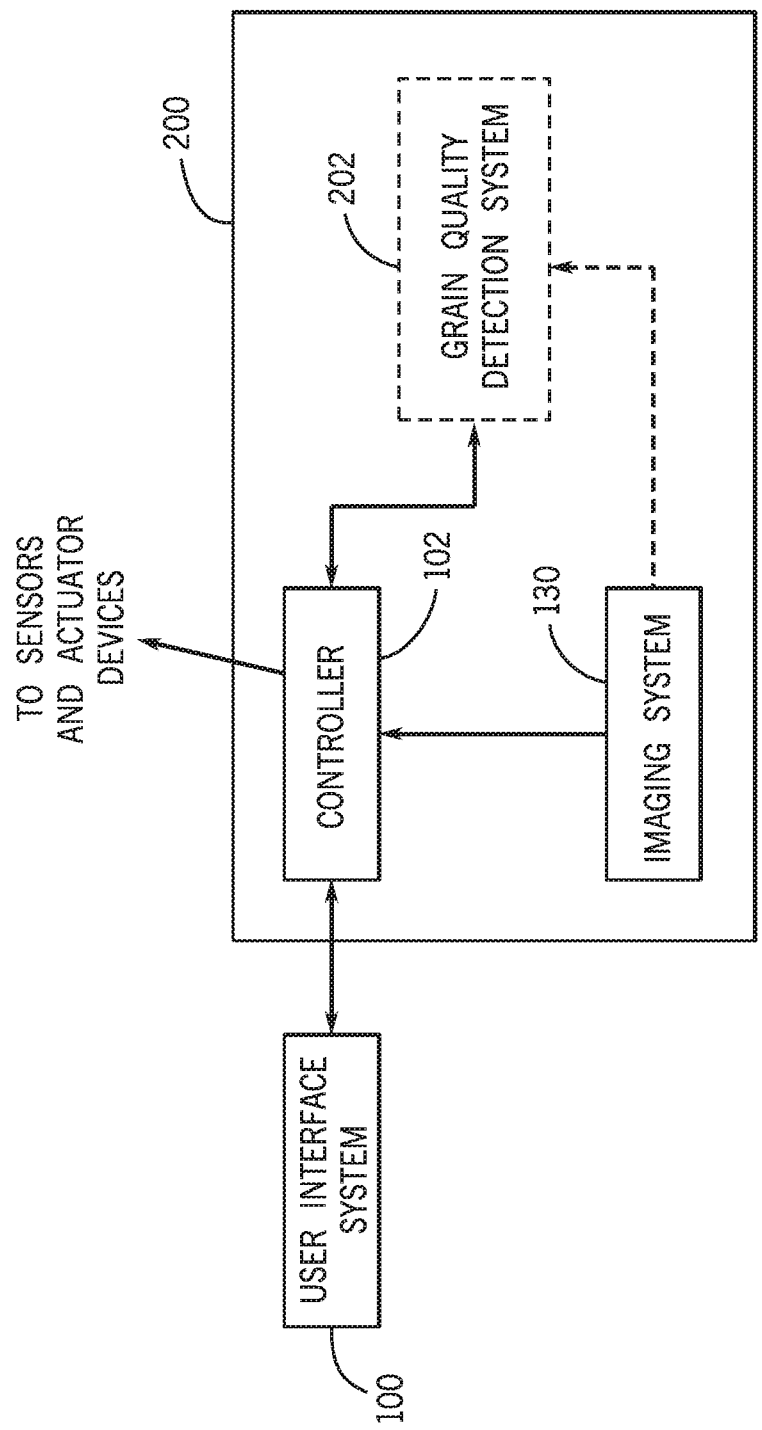
FIGS. 5 and 6 are schematic diagrams of an example grain quality control system according to this disclosure.

Referring also to FIGS. 2-4, the grain tailings elevator 70 communicates with the tailings auger 68 at an infeed or inlet opening 71 of the grain tailings elevator 70 where grain tailings are received for transport for further processing. In the embodiment depicted, sprockets 74 (one shown) are disposed at opposite ends of a grain tailings elevator housing 76 and a chain 78 (or other flexible member) is seated on the sprockets 74 to transfer power between the sprockets 74. A series of paddles 80 (or other transport members) are supported by the chain 78, such that as the sprockets 74 rotate, the chain 78 is moved to drive the paddles 80 along a generally clockwise oblong path (from the perspective of FIG. 4). In this way, grain tailings received into the tailings elevator housing 76 from the tailings auger 68 through the inlet opening 71 may be moved by the paddles 80 along a lifting portion of the oblong path. The chain 78, sprockets 74 and paddles 80 thus provide a conveyor arrangement 82 for the grain tailings elevator 70. At a top end of the tailings elevator housing 76, an outlet opening (or other offload location) 84 (see FIG. 1) is provided, such that grain tailings lifted within the grain tailings elevator 70 by the paddles 80 exits the tailings elevator housing 76 through the outlet opening 84 (e.g., for return to the thresher). After discharging the grain tailings through the outlet opening 84, the paddles 80 may continue (i.e., as moved by the sprockets 74 and the chain 78) along a return portion of the oblong path. In certain embodiments, a divider (not shown) may be provided between the lifting portion and the return portion of the oblong path, such that grain moved by the paddles 80 may be prevented from mixing. The paddles 80 may be spaced apart equally, unequally, or a combination thereof. Each of the paddles 80 have a front edge 86 and a rear edge 88, the front edge 86 being closer to a front side wall 90 of the tailings elevator housing 76 than the rear edge 88.

In a passive tailings implementation, the grain tailings elevator 70 carries the grain tailings upward and deposits them on a forward end of the rotor 38 to be re-threshed and separated. The grain tailings are then received by a discharge beater 92 where the remaining kernels of grain are released. The now-separated MOG is released behind the combine harvester 20 to fall upon the ground in a windrow or are delivered to a residue subsystem 94 that can include a chopper 96 and a spreader 98 where it can be chopped by the chopper 96 and spread on the field by the spreader 98. Alternatively, in an active tailings implementation, the grain tailings elevator 70 may deliver the grain tailings upward to an additional threshing unit (not shown) that is separate from the separator 36 and where the grain tailings are further threshed before being delivered to the main crop flow at the front of the cleaning subsystem 42.

Referring again to FIG. 1, the operator cab 26 includes a user interface system 100 with a set of user interface mechanisms, which the operator can use to control and manipulate the combine harvester 20. Such interface mechanisms include one or more display devices, audio devices for providing audio information, haptic devices that provide haptic feedback, levers, joysticks, steering wheels, pedals, buttons, etc. User interface mechanisms can also be a set of input mechanisms displayed on a user interface display. For instance, they can be links, icons, or other user actuatable mechanisms.

The user interface system 100 can also include various input and output functionality for interfacing (i.e., controlling or receiving feedback from) various machine components via various sensors and actuators through one or more master (or other) controllers, represented by controller 102. It will also be appreciated that the combine harvester 20 can include other sensor and actuator devices in addition to the aforementioned separator loss sensor 37, the cleaning show loss sensors 62, 64 and actuation arrangement 52 in the cleaning subsystem 42, and the motor 46 of the fan 44. For example, the combine harvester 20 can include a ground speed sensor 104 that senses the travel speed of combine harvester 20 over the ground, for example, by sensing the speed of rotation of the wheels, the drive shaft, the axle, or other components. The travel speed can also be sensed by a positioning system, such as a global positioning system (GPS), a dead reckoning system, a LORAN system, or a wide variety of other systems or sensors that provide an indication of travel speed. Other sensors and actuators can include a rotor speed sensor 106, a threshing gap sensor 108, a grain yield sensor 110, a threshing load sensor 112, a clean grain quality sensor 113, a straw quality sensor 114, a header height sensor 116, a feederhouse mass flow sensor 118, a header actuator and threshing gap actuators 122, 124. All of these and others may be configured for interfacing with the operator via the user interface system 100, which may provide input to the grain quality control system to enhance the grain tailings monitoring and assessment, and thereby the control and yield performance of the combine harvester 20, which will now be described in more detail in connection with various example embodiments in which the imaging hardware is directly mounted to, and configured to interrogate the grain tailings within, the grain tailings elevator 70.

Referring again also to FIGS. 2-4, an imaging system 130 includes a camera 132 with an image sensor 134 and a housing 136. The camera 132 may be have its own housing contained within the housing 136 or instead be housed only by the housing 136. The housing 136 may be open at the side facing the grain tailings elevator 70 or it may have a side wall 138 with an opening or be made of a translucent material to allow light in sufficient for the camera 132 to image the interior of the grain tailings elevator 70. The camera 132 may be a high resolution and frame rate camera, such as a high resolution (e.g., 1080p high-definition) at 10,000 or more frames per second; however, the camera may have lower resolution (e.g., 5 megapixels) and lower or higher speeds (e.g., up to 1,000,000 frames per second). The housing 136 is mounted directly to the side wall 90 of the tailings elevator housing 76 such that the open side or side wall 138, and thus the image sensor 134, are aligned in registration with a window 140 in the front side wall 90 of the tailings elevator housing 76. In other embodiments, the camera 132 may be mounted directly to another side wall, such as lateral side wall 91 of the elevator housing 91. The image sensor 134 of the camera 132 is trained on the conveyor arrangement 82 and configured to image the grain tailings transported by the conveyor arrangement 82 through the grain tailings elevator 70. In the illustrated example, the housing 136 is mounted to the grain tailings elevator side wall 90 with a latch 142 and a hinge 144 providing a pivotal connection to the grain tailings elevator 70, such as for replacing and/or cleaning the camera 132. Alternatively, the housing 136 may be mounted to the tailings elevator side wall 90 using one or more screws or any other suitable fastening mechanisms. The imaging system 130 images the grain tailings within the tailings elevator housing 76 either as carried by the paddles 80 or in a state of suspension between the paddles 80 as the paddles 80 move the grain tailings through the tailings elevator housing 76. Where the camera 132 is mounted directly onto the grain tailings elevator 70, as in the illustrated example, without the use of a bypass duct, the grain tailings do not need to be redirected through a bypass duct for imaging at a lower speed. Thus, saving the expense and complexity of bypass structures and avoiding the associated reduction in flow rate for the bypassed grain tailings. In various implementations, the clean grain elevator 58 may be equipped with a grain quality control system (and the attendant control hardware and software) having one or more image sensors or cameras mounted directly to the clean grain elevator housing. Alternatively or additionally, the clean grain elevator may include a bypass duct (not shown) in which the clean grain quality sensor 113 samples the clean grains. The sampled clean grains may be imaged and analyzed to improve identification and classification of the grains.

As illustrated, the camera 132 is generally positioned at a bottom half of the tailings elevator housing 76. In one implementation, the camera 132 is mounted to the tailings elevator housing 76 within a distance D from a bottom end 146 of the tailings elevator housing 76, approximately one quarter to one third of the overall length of the tailings elevator housing 76. Mounting the camera 132 at a position very near either sprocket (e.g., sprocket 74) may adversely affect the clarity of images captured by the camera 132, since the paddles 80 tend to accelerate near the sprockets 74. Further, in the illustrated example, the camera 132 is generally mounted parallel relative to the position of the side wall 90 of the tailings elevator housing 76. In other implementations, the camera 132 can be positioned at an angle relative to the side wall 90 of the tailings elevator housing 76 to aid in providing a particular point-of-view for the camera 132 (e.g., to better face a top side of the paddles 80 or allow front edge to back edge inspection of the paddles 80).

The shape of the window 140 generally tracks the shape of the field-of-view of camera 132, and is rectilinear, indeed square, in the illustrated example. Other suitable geometric and non-geometric shapes are contemplated. The window 140 may be an opening in the side wall 90 (as shown), or it may be a translucent or transparent sheet or plate (e.g., made of plastic or glass) for unobstructed view into the interior of the tailings elevator housing 76.

In the illustrated example, the width of the window 140 is less than the width of the side wall 90. In other implementations, a window having a greater width, including a width approximately or equal to the width (i.e., the dimension between lateral sides of the paddles 80) of the side wall 90 may better allow for full-width images of the grain tailings on the elevator paddles 80, or to provide space for multiple cameras or other image sensors. In one implementation, the camera 132 captures images of the grain tailings at a field-of-view between the front edge 86 and the rear edge 88 of the paddles 80 at the interior of the tailings elevator housing 76. In this manner, images of the grains on the whole of the top surfaces of the paddles 80 may be captured.

In an example implementation, the grain tailings elevator 70 can have more than one sensor, such as the sensors 160 and 162, shown in FIG. 4. Each of these sensors 160, 162 can be positioned internally or externally relative to the housing 136. A greater number of sensors may enhance the performance of the imaging system 130. For example, multiple image sensors (or cameras) may be placed side-by-side, in stereo fashion, to enhance the depth perception of the camera vision, like the binocular vision of humans. The relative focus of the two image sensors (or cameras) can better indicate the physical location on the paddle as well as the depth of the grain tailings. The location and depth of the grain tailings can be probative of their constituents, since the material property of broken grains tends to be different than the material property of clean grains and centrifugal force generally causes heavier or denser grain material to travel differently (e.g., farther in a radial direction (away from a rotation axis of the sprockets 74) relative to lighter or less dense grain material). The closer tailings are to the camera 132 (i.e., the closer to the front edge 86 of the paddle 80 carrying the tailings), the more likely the tailings are broken grain or MOG (non-clean) because the tailings are heavier and denser. Conversely, the farthest the tailings are located from the camera 132 (i.e., the closer to the rear edge 88 of the paddle 80 carrying the tailings), the cleaner the tailings because the tailings are lighter and less dense. Additionally, with regard to stereo imaging, two or more images sensors (or cameras) can be used to indicate depth information while one image sensor (or camera) may provide the primary indication of color, focus/defocus, lighting, and exposure information, for example. Use of stereo camera imaging also allows for better maintenance of the paddles 80 and/or chain 78.

Further, the imaging system 130 may be operated in coordination with the conveyor arrangement 82. For example, one or more sensors may initiate the capture of images by triggering or signaling to the camera 132 (or other image sensors) when a sensor detects a paddle 80 at a particular location within the tailings elevator housing 76, relative to the camera 132, or based on a prescribed time delay. In one implementation, for example, a sensor (e.g., sensor 160) detects the position of the paddles 80 as each paddle 80 approaches or reaches the field-of-view 150 of the camera 132 so that the image is captured at a time in which the full-width of the top side of the paddle 80 is within the field-of-view 150 of the camera 132, thereby facilitating a full-width and front-to-back image of the grain tailings supported by the paddle 80. In another implementations, no additional sensors are employed, and the camera 132 is programmed to capture images at a predetermined rate and period that are synchronized with the travel of the paddles 80. In still other implementations, the camera 132 continuously captures images at a sampling rate that is coordinated with the paddle speed.

Having described various mechanical aspects of the grain quality control system, referring now also to FIGS. 5-11, the control and logic architecture of an example grain quality control system 200 will now be detailed in the context the example grain tailings elevator described above with reference to assessing the grain and non-grain material of the grain tailings. It should be understood that the grain quality control system could be used to monitor, assess and make machine adjustments based on the clean grain within the clean grain elevator or at other locations along the flow path of the grain through the combine harvester 20. The grain quality control system 200 accurately estimates or determines the grain material quality, or classification, of grain tailings of crop harvested by the combine harvester 20. As will be described, the grain quality control system 200 may be implemented through the master controller 102 of the combine harvester 20, local or remote processor(s) of the imaging system 130, through a remote processing device (e.g., a portable device or a remote computer network) or a combination thereof.

Generally, the user interface system 100 communicates with the grain quality control system 200, wirelessly or by wire, to display monitoring, identification, and classification information about the grain tailings to the operator of the combine harvester 20. The user interface system 100 may be configured so that the operator may initiate communication with the grain quality control system 200 through the user interface system 100 to access reports, charts, or other visuals showing the status of the grain tailings. The user interface system 100 may display various information pertinent to the operator and to the operation of the combine harvester 20, such as the grain type for a particular crop, allowing the operator to identify potential erroneous reporting of the identification of a crop being harvested by the harvester 20. The operator may also be able to initiate various diagnostics processes, system maintenance procedures, and testing procedures through the user interface system 100. The user interface system 100 can display various heuristics about the grains in the grain tailings elevator 70, examples of which include diagnostics, detected crop type, confidence level, and grain material classification. The operator may be physically located in the cab 26 of the harvester 20 when communicating with the user interface system 100. Alternatively, the operator may be remotely located relative to the user interface system 100 and communicating with the user interface system 100 through a wireless communication protocol, such as Wi-Fi, Bluetooth, or JDLINK. In one embodiment, a graphical user interface (GUI), under the control of an operating system, can implement the user interface system 100 and captures the interactions between the operator and the user interface system 100 and causes displaying of the requested information.

The user interface system 100 directs messages and information, input by the operator, to the controller 102, and the controller 102 relays the operator's input to a grain quality detection system 202 of the grain quality control system 200. Alternatively, the controller 102 receives input generated by a local or remotely-located machine or device, such as a local computer or a cloud-based web server. A cloud-based web server may be, in turn, controlled by user interaction through the web server of the Internet, for example.

The controller 102 is responsive to input from the operator and the grain quality detection system 202 and uses this information to control various sensor and actuator devices of the combine harvester 20, such as those listed above (e.g. speed of the fan 44, motion of the sieve 48 and the chaffer 50, and so forth). The grain quality detection system 202 may be physically incorporated in the imaging system 130. Alternatively, these two systems may be remotely located and communicate wirelessly. In yet another embodiment, the grain quality detection system 202 is a part of the controller 102 or the grain quality detection system 202 is a part of a control-distributed system where the grain quality detection system 202 includes its own controller, which, in turn, communicates with the master controller 102. Images generated by the camera 132 of the imaging system 130 are transmitted to the grain quality detection system 202 through the controller 102, or alternatively directly transmitted by the imaging system 130 to the grain quality detection system 202. In the former embodiment, the controller 102 has the flexibility of performing some of the processing tasks typically performed by the grain quality detection system 202 to offload the grain quality detection system 202. An application of the foregoing embodiment is where the grain quality detection system 202 is remotely communicating with the controller 102 and system bandwidth is limited. Additionally, the controller 102 is in a position to coordinate the activities of the devices of the combine harvester 20, such as the various sensor and actuator devices referenced above.

The grain quality detection system 202 is configured to perform analysis of and diagnostics on sample images from the imaging system 130 of grain tailings in the grain tailings elevator 70. The sample images are captured at a sampling location within the grain tailings elevator 70 with a high performance camera, such as the camera 132. The high-performance characteristic of the camera 132 coupled with the advanced processing performance of the grain quality detection system 202 provide for enhanced constituent part identification and classification. The sampling location is a location within the field-of-view of the camera 132 within the grain tailings elevator 70. The sample images are defined by a set of image pixels that are represented by image data. A classification feature associated with the sample images describes the grain material of the grain tailings. A non-limiting list of classification categories of grain and non-grain material may include clean grain, broken grain, MOG light, MOG heavy and unthreshed grain. It will be understood that grain tailings classified as "clean" grain include grain that has been completely threshed, "broken" grain tailings include partial clean grains, such as grain that has been severed or crushed in some way, "MOG light" is relatively lightweight chaff or other non-grain material such as leaves and husks that may be readily blown by the fan 44, "MOG heavy" is non-grain material that is denser or heavier to the extent that it is not readily blown away, such as sticks, bark and so on, and "unthreshed" grain is grain that has not been separated from its husk. Various other definitions for these categories may be provided. Further, additional classifications and subclassifications may be included in the grain quality control system 200. For example, one supplementary classification may be made an "empty space" classification. An "empty space" is a space between grain tailings devoid of grain tailings. Classification of empty spaces assists in accurately categorizing grain tailings by eliminating the possibility of classifying an erroneous grain type. Further, identification of empty spaces helps to improve classification of grains by avoiding potential mislabeling of a void as grain, MOG and so on.

Figure 6:
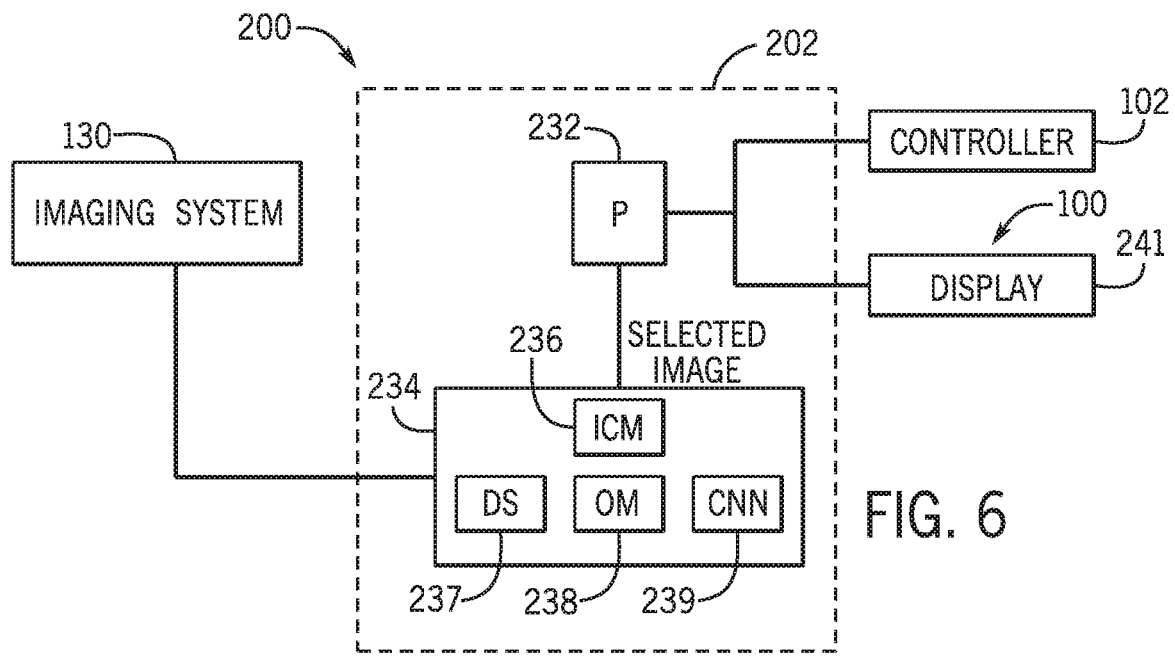

With reference now to FIG. 6, the imaging system 130 selects one or more sample images to be processed, the selected sample image(s) are represented by a subset of image pixels of the set of image pixels of image data. The imaging system 130 generates output signals to a memory 234. The output signals carry the image data representing the selected sample images.

The processor 232 comprises at least one processing unit configured to analyze image data of the selected images received from the imaging system 130 and generates outputs based on such analysis. For purposes of this application, the term "processing unit" or "processor" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, in other implementations, the processor 232 is embodied as part of one or more application-specific integrated circuits (ASICs). Unless otherwise specifically noted, the controller is not limited to any specific combination of hardware circuitry and software, nor to any particular source for the instructions executed by the processing unit.

The controller 102 can also comprise one or more processing units configured to output control signals to direct the operation of a piece of grain handling equipment, such as various components of the combine harvester 20. In one embodiment, the controller 102 outputs control signals that control and adjust the operational parameters of the combine harvester 20, as listed above.

A display 241 of the user interface system 100 may include one or more devices by which information regarding the quality of grains is visibly presented. For example, the display 241 may include a series of light emitting diodes that provide alerts or notifications regarding grain quality. The display 241 may be a display screen, such as a touch screen and include speakers or other auditory devices by which information is communicated.

The memory 234 includes a non-transitory computer-readable medium containing program logic, in the form of code, software, circuitry or instructions, which direct the operation of processor 232. The memory 234 additionally serves as a persistent storage device by which data is stored. Although the memory 234 is illustrated as a single memory, in other implementations, it can be distributed amongst multiple memory devices or memory locations, such as across a local area network or a wide area network. In the illustrated example, the memory 234 comprises software modules which carry out analysis of grain quality and which provide for direct output based upon the results of such analysis.

In the example illustrated, the memory 234 comprises an image capture module (ICM) 236, a data storage module (DS) 237, a convolutional neural network (CNN) module 239, and an output module (OM) 238. The ICM 236, DS module 237, OM 238 and CNN module 239 each comprise program logic to direct the processor 232 in the implementation of a method 288 for grain quality control, as outlined in FIG. 7. The imaging system 130 transfers one or more sample images of the grain tailings, acquired from the interior of the tailings elevator housing 76, to the ICM 236 of the memory 234. The imaging system 130 selects one of the sample images for processing, as indicated by the blocks 290 and 292 of FIG. 7. In one implementation, the ICM 236 saves the selected image data corresponding to the selected image in the DS module 237 and transmits it, or transmits the saved version of the selected image data, to the processor 232 for processing.

Figure 7:
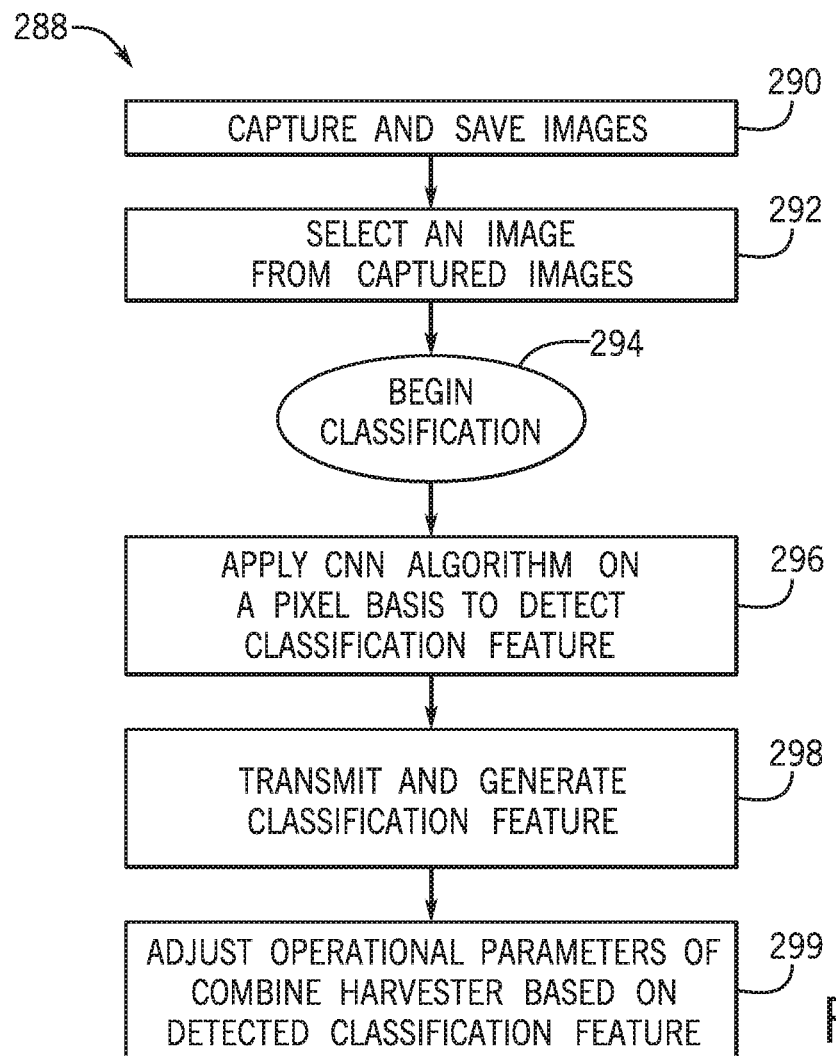
FIG. 7 is a process flow diagram of an example method for implementing the grain quality control system according to this disclosure.

As indicated by block 294 in FIG. 7, classification of the grain tailings begins. In one implementation, the CNN module 239 directs the processor 232 to carry out one or more processes upon the selected image data to enhance the image analysis by applying a CNN algorithm to the selected image data on a pixel basis, as indicated by block 296 of FIG. 7. CNN algorithms are a form of deep-learning logic, which may be employed in image processing applications to detect or discern features of an image without any or with reduced pre-processing or pre-filtering of the sample images. CNN algorithms are computationally efficient as they use special convolution and pooling operations and perform parameter sharing. This enables CNN models to run universally on various processing devices offering powerful and efficient modeling for performing automatic feature extraction in image processing applications. Various CNN algorithms may be implemented, one of which is, without limitation, PixelNet, developed by Carnegie Mellon University, as detailed in "PixelNet: Representation of the pixels, by the pixels, and for the pixels," available at http://www.cs.cmu.edu/~aayushb/pixelNet/, and hereby incorporated by reference in its entirety. CNN algorithms are typically implemented by a number of stages of variable filters with adjustable weights and multipliers. In one implementation, the number of classifications associated with the selected image dictates, at least in part, the number of stages and weights implementing the CNN algorithms. For example, a classification feature of ten types of grain materials may require a larger number of stages and weights than a classification feature of three types of grain materials would require.

Continuing, the processor 232, with the assistance of the CNN module 239, generates classification (or control) signals representing a probability of classification of the grain tailings, which may be regarded as the actual classification of the grain tailings. Upon the completion of the application of the CNN algorithm to the selected image data, the OM 238 directs the processor 232 to generate signals representing the probability of each classification, as indicated by the block 298 of FIG. 7. Accordingly, the CNN module 239 implements the features of the CNN algorithm, such as weights and stages, at least in part, based on the classification of the selected image.

In one implementation, the ICM 236 collects image data representing image pixels of the selected images and analyzes the corresponding selected image data based on a unique classifier algorithm (e.g., a classifier algorithm associated with harvesting). The ICM 236 updates the classification, or a supplementary classification, using the classifier algorithm. The classification signals from the processor 232 represent a confidence measure based on the probability of accurately identifying the grain material. The classification signals may be a binary representation of the classification feature of the grain tailings where the grain tailings are classified as having a particular classification feature, or not.

In one embodiment, an "N" number of sample images of the grain tailings are selected by the ICM 236, "N" representing an integer value. The N sample images are defined by N sets of corresponding image pixels. The CNN module 239, in conjunction with the processor 232, applies the CNN algorithm on each set and upon completion of the application of the CNN algorithm on a set, repeats the process for each of the remaining sample images until all N sets are processed. In one implementation, when N falls below a predetermined threshold, processing stops and the CNN algorithm is announced fully applied. Generally, processing a higher number of sample images, as described above, yields a higher confidence measure.

For further details of components of the grain quality control system 200 commonly disclosed, the reader is directed to U.S. Pat. No. 9,779,330, issued to Wellington et al., on Oct. 3, 2017 and titled "Grain Quality Monitoring", the disclosure of which is incorporated herein by reference as though set forth in full.

In block 299, the OM 238 outputs control signals representing the classification of the grain tailings to the controller 102 to adjust the operational parameters of the combine harvester 20. For example, the controller 102 may issue control commands to any of the various actuator devices specified above to make adjustments to the crop processing components of the combine harvester 20 (e.g., the threshing components, cleaning components, and so on.)

Figure 8:
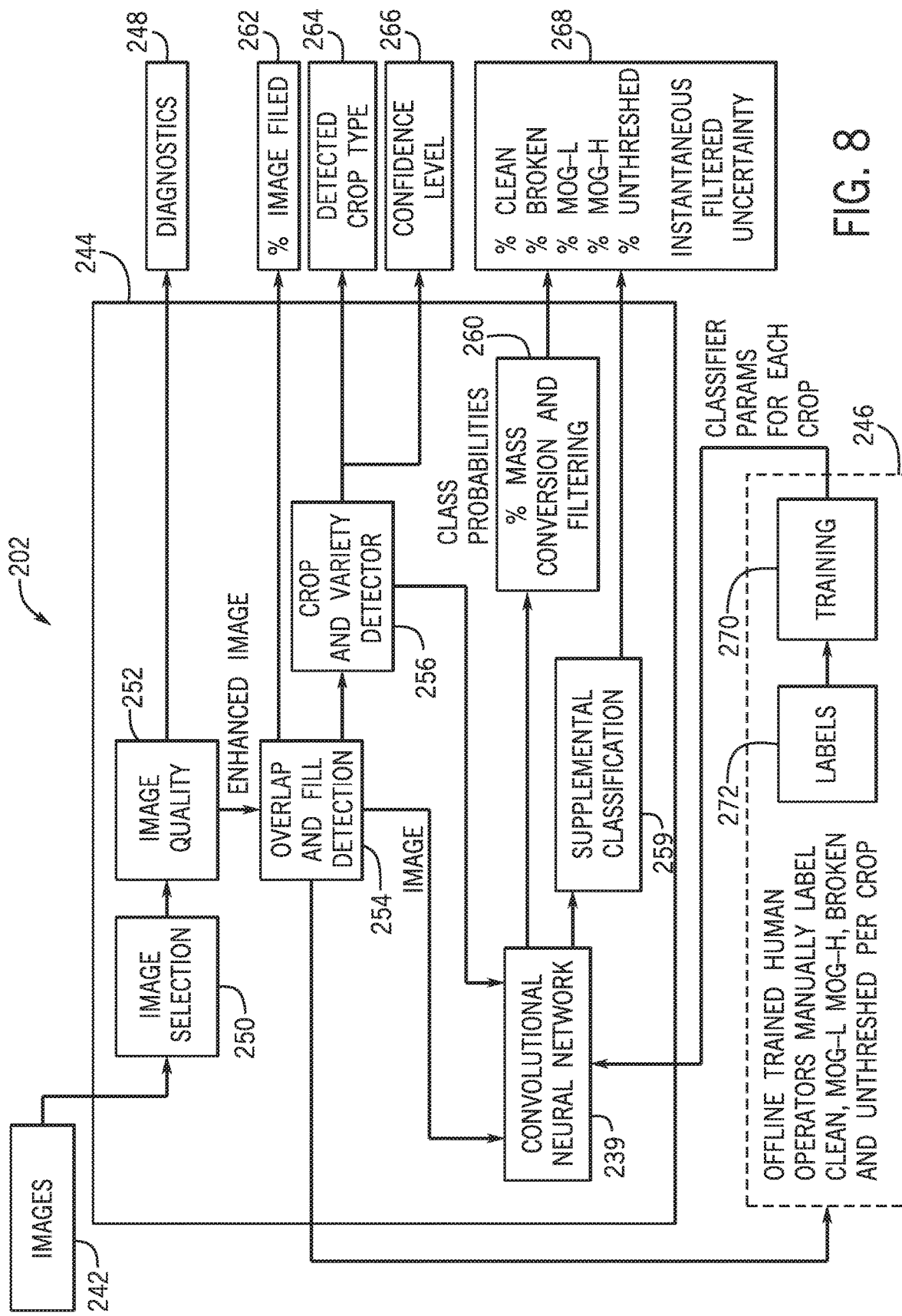
FIG. 8 is a schematic diagram of an example grain quality detection system for the grain control system according to this disclosure.

As shown in FIG. 8, in one embodiment, the grain quality detection system 202 receives sample images 242 of grain tailings from the imaging system 130. The sample images 242 are analyzed by an image analyzer 244, and a crop-specific parameter generator 246. The image analyzer 244 comprises one or more processors and associated program logic in the form of code, software and/or circuitry, stored in a non-transitory computer-readable medium or memory, shown in FIG. 5. The program logic includes instructions to the processor of the controller 102 for execution by the processor. The image analyzer 244 comprises an image selection module 250, an image quality module 252, an overlap and fill detection module 254, the CNN module 239, a crop and variety detector module 256, and a conversion and filtering module 260. The crop-specific parameter generator 246 includes a labels module 272 and a training module 270. The crop-specific parameter generator 246, in one implementation, can include one or more processors.

The image selection module 250 receives images 242 of the grain tailings captured in the tailings elevator 70 and performs burst imaging and pre-filtering, as described below, on the received sample images to help in the selection of images for full processing. As earlier noted, the paddles 80 of the grain tailings elevator 70, shown in FIG. 4, transport the grain tailings. The grain tailings are likely not evenly distributed between each pair of the paddles 80. Uneven distribution of the grain tailings can have a negative impact on classification. Additionally, the speed of the flow of the grain tailings may vary between pairs of paddles, also negatively affecting the classification results. The image selection module 250 employs image sensors, such as the image sensor 134 (and in the event either of the sensors 160, 162 are image sensors), for classification of the grain tailings at the sampling location and reduces biasing, optimizes sample size, and reduces motion blur in the images. To compensate for uneven grain tailing distribution, the image selection module 250 pre-filters each image input, or sample image, by applying an image selection algorithm to the image to identify the images that are worthy of full processing and classification. The image selection module 250 generates selected images that have survived the pre-filtering process and transmits the selected images to the image quality module 252.

The image selection algorithm, employed by the image selection module 250, can be implemented in accordance with a number of techniques and primarily focuses on identifying images with the largest number of grains and is also based on the location of the grains relative to their neighboring grains. Examples of such image selection algorithms, without limitation, include application of a Gaussian energy algorithm, color distribution measurement, texture distribution measurement, image brightness distribution measurement, or identification of the particular elevator paddle onto which the grain is transported. In one implementation, one or more of the paddles 80 may be identified for image classification, template matching, or pattern recognition.

The image quality module 252 receives the selected images from the image selection module 250, as described above, and analyzes the selected images to identify, or detect, impaired images. Certain circumstances may impair the quality of the images at the time of sampling, such as poor focus, lighting and color, and extraneous material, smudges, moisture or dirt on the window 140. The image quality module 252 removes the impaired images, leaving the enhanced images as output to the overlap and fill detection module 254. In one embodiment, the impaired images are output to a diagnostics module 248 for diagnosis. In response to detecting poor image quality, the image quality module 252 can warn the operator of the combine harvester 20 of the impaired images or of the extent of the damage. For example, a predefined threshold may be compared to the number of poor images and when the number of poor images exceeds the predefined threshold, the image quality module 252 can take additional remedial actions. Examples of such additionally remedial actions, without limitation, include digitally masking poor-quality areas of the images. In some implementations, the image quality module 252 may be omitted altogether.

The overlap and fill detection module 254 analyzes the enhanced images from the image quality module 252 or the selected images from the image selection module 250, as the case may be. The overlap and fill detection module 254 monitors and tracks the movement of grain tailings within the tailings elevator 70. For example, the overlap and fill detection module 254 analyzes the enhanced images to determine the extent to which the tailings elevator 70 is filled with grain tailings. In one implementation, an assessment of the consumed volume of the grain tailings elevator 70 is done based on intensity gradients and other image characteristics. The overlap and fill detection module 254 generates an output commensurate with a percent fill signal 262 indicating the percent of images filled with grain tailings. In one implementation, based on the detected fill of the tailings elevator 70, the overlap and fill detection module 254 directs the processor 232 (shown in FIG. 6) to output control signals to the combine harvester 20 when the grain tailings elevator 70 is sufficiently filled. In another implementation, the overlap and fill detection module 254 identifies unfilled portions of the image and outputs a signal accordingly.

The overlap and fill detection module 254 further tracks the movement of grain tailings across the tailings elevator 70 for identifying overlapping grain tailings images and preventing double counting of the same grain tailings sample. In one implementation, the overlap and fill detection module 254 assumes a mostly linear motion of grain tailings across the grain tailings elevator 70. In one implementation, the overlap and fill detection module 254 analyzes sequential images and generates correlation scores for portions of the images. Based upon the correlation scores, the overlap and fill detection module 254 identifies overlapping portions of such images to avoid double counting the overlapping portions. As a result, the load on the processor 232 (shown in FIG. 6) is reduced. After processing, the overlap and fill detection module 254 outputs the processed images to the CNN module 239.

Figure 9:
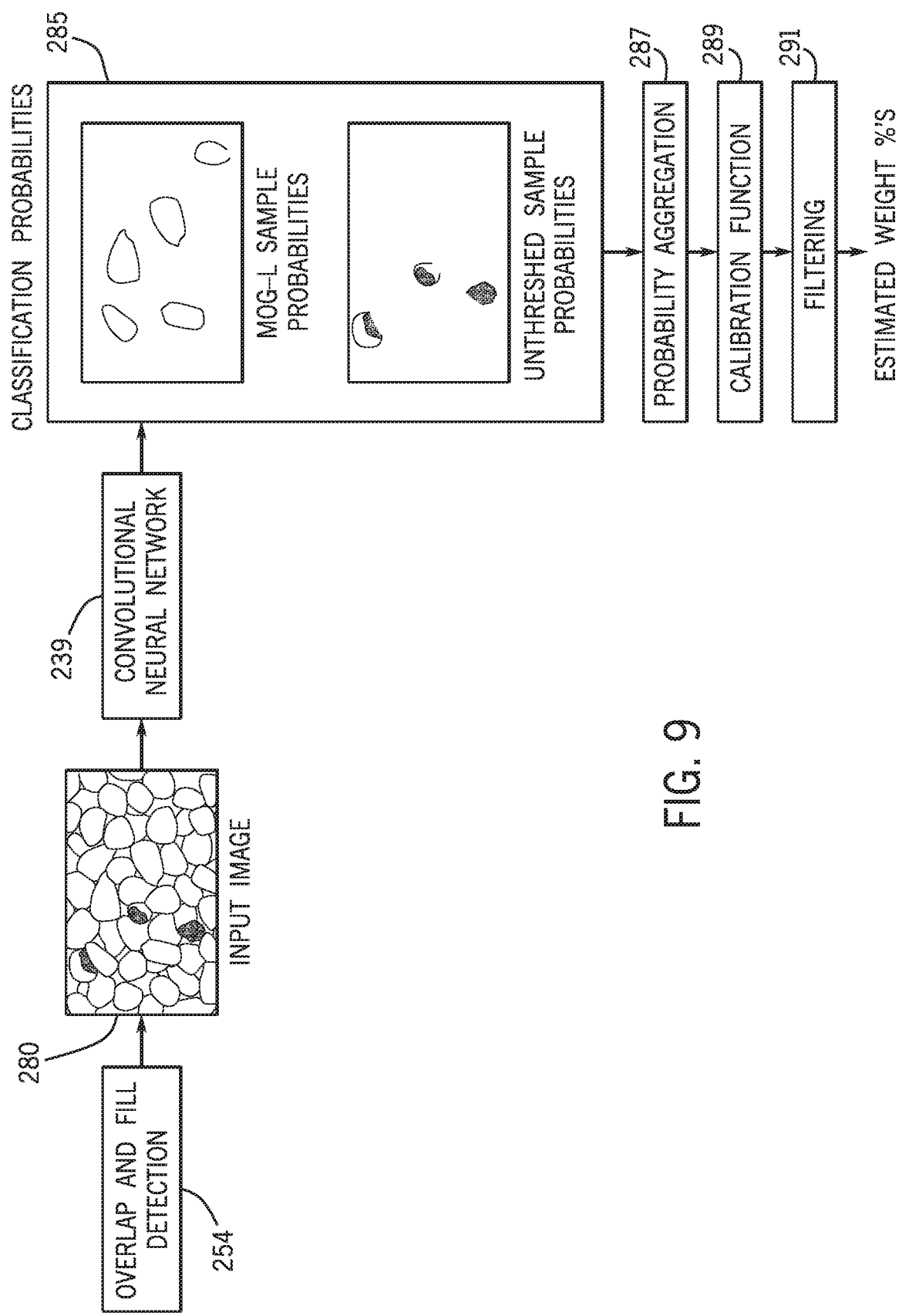
FIG. 9 illustrates an example probability assessment process for certain material classifications of an image from the grain quality control system according to this disclosure.

With further reference to FIG. 9, in one implementation, the overlap and fill detection module 254 aggregates 287 the classification probabilities 285 and applies a calibration function 289 to the aggregated sample probabilities to determine a percent by mass/weight value for the class of material for an input image 280 in its entirety. The overlap and fill detection module 254 further applies filtering 291 to output an estimate of weight percentages for classes of material.

The crop and variety detector module 256 analyzes values associated with one or more features of the processed images from the overlap and fill detection module 254 to identify the type of particular crop and possibly the particular variety of the crop presently being harvested. The determined or identified crop type and variety are output as signals 264 for recording with the particular associated geo-referenced locations being traversed by the combine harvester 20. In one implementation, the identified crop type and variety may be viewed on the display 241 (shown in FIG. 6). For example, a field may be planned with multiple crop types or multiple varieties. The crop and variety detector module 256 detects changes in the crop type and variety as the harvester is crossing the field. The crop and variety detector module 256 records such changes with respect to different geo-referenced locations in the field. In one implementation, the grain quality results may be stored and associated, in the memory 234, with the particular identified crop variety and type as well as the particular geo-referenced locations in the field. In one implementation, the detected crop type is output to the controller 102 enabling the controller 102 to change its control strategy based on the detected crop type.

The crop and variety detector module 256 may be absent from the grain quality detection system 202 or it may be manually overridden where the operator specifies the crop type to the CNN module 239. In the implementation where the crop and variety detector module 256 is missing, the CNN module 239 uses generic parameters to link feature values to classification probabilities where a distinct lookup table or mathematical relationship or formula is assigned to and used for a particular class of grain material, such as those listed herein.

In yet another implementation, the crop and variety detector module 256 compares the values received from the CNN module 239, for one or more features of the grain tailings, to normal, typical or standard values or ranges of values and determines a degree, level, or measure of confidence that the particular feature values received from the crop and variety detector module 256 are indeed for the crop that is being harvested. In such an implementation, the crop and variety detector module 256 outputs signals representing an indication, such as a confidence level indication 266. The controller 102 can employ the confidence level indication 266 to change the indication of the classification signals 268. For example, the indication of classification signals 268 may be changed to represent the quality of the grain tailings. The confidence level indication 266 may be presented to the operator via the display 241. Where the values for features received from the CNN module 239 are drastically different from typical or expected feature values for the crop being harvested, the crop and variety detector module 256 can output signals indicating an extremely low confidence level. In one implementation, if the difference between the received feature values and the expected feature values exceeds a predefined threshold, a warning indication may be displayed or audibly presented to the operator. Such a difference may indicate various issues and can lead to a low confidence level that may be caused by the operator, such as entering the wrong crop type, or it may be the result of the harvester temporarily traversing an abnormal region of a field containing an abnormal patch of plants. The classification signals 268 and the confidence level indication 266 can be employed by the controller 102 to adjust the operational parameters of the combine harvester 20 and improve grain quality.

In one implementation, the CNN module 239 directs the processor 232 to determine the probability for distinct grain material classifications at a particular sampling location. For example, the CNN module 239 can assign a particular sampling location a probability for each of a number of different classifications. By way of a specific example, the CNN module 239 can assign the particular sampling location a probability of x % that the image sample is depicting a first classification of a grain material and a probability of z 7% that the sampling location is depicting a second classification of the grain material and so on, where the sum of the probabilities does not exceed 100%. In one implementation, the CNN module 239 directs the processor 232 to determine a probability for the presence of a first material classification, such as broken grain, at the location of the camera 132 as well as a probability for the presence of a second different material classification, such as MOG heavy or MOG light, at the location of the camera 132.

In one implementation, the CNN module 239 uses different filter weights and adjusts the filter weights according to a feature set or sets of features, and different probabilities for different classifications of materials corresponding to the different values for different combinations of features. In one implementation, probability entries are generated by taking multiple grain samples, capturing an image of each of the multiple grain samples, and having experts or trained human operators label different parts of the image to form the labels module 272. In another implementation, trained personnel manually label different parts of the image (e.g. clean, MOG heavy, MOG light, broken, or unthreshed, per crop). For instance, a crop can be labeled wheat, corn, soybeans and canola by human operators. The labeled images are digitally input and can be stored in DS module 237 of the memory 234 for use by the training module 270.

Figure 12A:
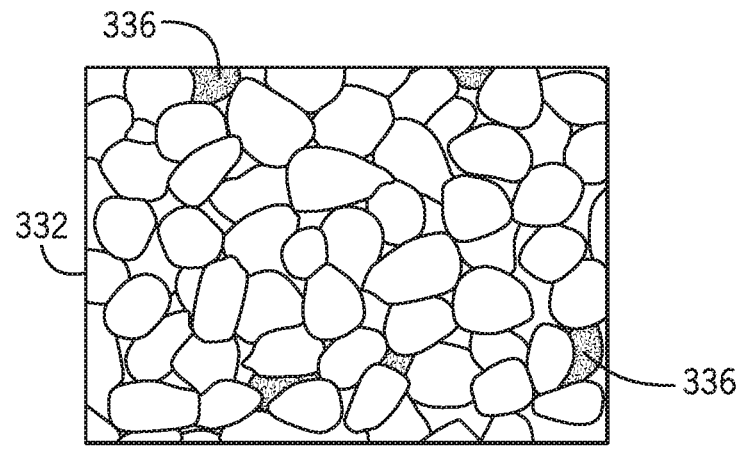
FIGS. 12A and 12B are example images of grain tailings.
Figure 12B:
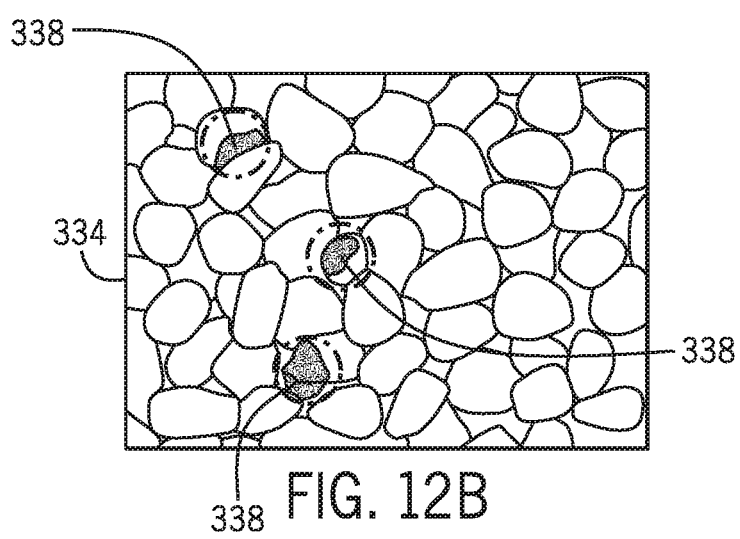

In accordance with various implementations, indication of classification to the operator can be done in a user-friendly fashion, such as shown in the images of FIGS. 12A and 12B. FIG. 12A shows an image of grain tailings processed using the CNN algorithm. Each piece of grain is not intentionally segmented, as done by prior art grain quality control techniques. Rather, classified grains are highlighted areas, as shown at 336. FIG. 12B shows an image of grains that has undergone CNN processing in addition to instance segmentation, which allows for producing overlays or annotating images selecting specific pieces of grain material, shown at 338.

The training module 270 may include one or more processors and associated program logic which direct the generation of a lookup table or mathematical relationship through machine learning by using a large list of feature vectors and label pairs. The training module 270 uses the labels to determine the desired probabilities of grain material of the grain tailings and sends these desired probabilities to the CNN module 239.

In one implementation, as shown in FIG. 8, the CNN module 239 is operable in one of various modes (e.g., selectable by the operator) where the grain quality detection system 202 analyzes the grain tailings for different classifications of grain material. Examples of different classifications of material for which the CNN module 239 makes a prediction are listed above and may include empty spaces, as noted. In some implementations, the CNN module 239 may predict other classifications of material depending upon a particular grain type and the particular plant from which the grain is harvested. The probabilities for such other classifications may be provided in lookup tables or mathematical relationships that are generated for the labels module 272 and the training module 270.

The conversion and filtering module 260 is responsive to the CNN module 239 output as well as a supplemental classification signal 259 and converts or maps the image sample classification probabilities across all grain tailings sample images, from the CNN module 239 and the supplemental classification signal 259, to a percent-by-weight output for different classifications of materials (including supplemental classifications) in the grain tailings. The conversion and filtering module 260 determines and outputs the classification signals 268 indicating the quality of the grain for the sample images based upon an aggregate of the probabilities, for the particular material classification, of the different image samples constituting the sample images. In the example illustrated, the conversion and filtering module 260 outputs, to the display 241, grain quality information such as percent by mass/weight clean, percent by mass/weight broken, percent by mass/weight material other than grain light, percent by mass/weight material other than grain heavy, percent by mass/weight unthreshed and so on. In one implementation, the conversion and filtering module 260 further calculates statistics regarding such grain quality results where instantaneous, filtered, and the uncertainty in the measurements are calculated for the display, machine control, and storage module(s) of the combine harvester 20.

In the illustrated example, the conversion and filtering module 260 applies a calibration function to a statistic derived from an aggregate of the different classification probabilities of the different image samples. In one implementation, the conversion and filtering module 260 converts image sample classification probabilities across an image to a percent by mass/weight for a classification of material for the image by applying a calibration function in the form of a linear curve which maps average classification probability across the grain tailings image to a ground truth percent by weight or percent by mass for the classification of grain material.

Figure 10:
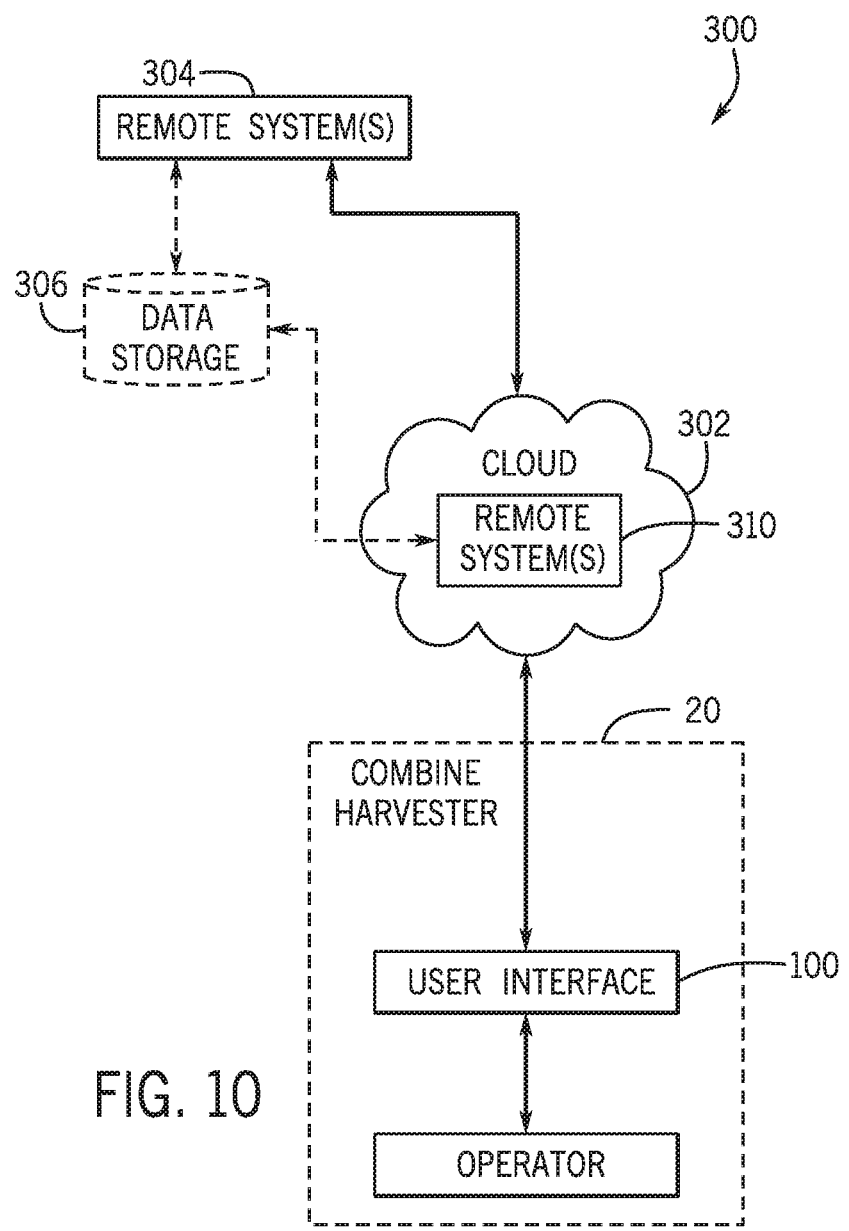
FIGS. 10 and 11 are schematic diagrams of a remote connectivity system for the agricultural combine harvester of FIG. 1.
Figure 11:
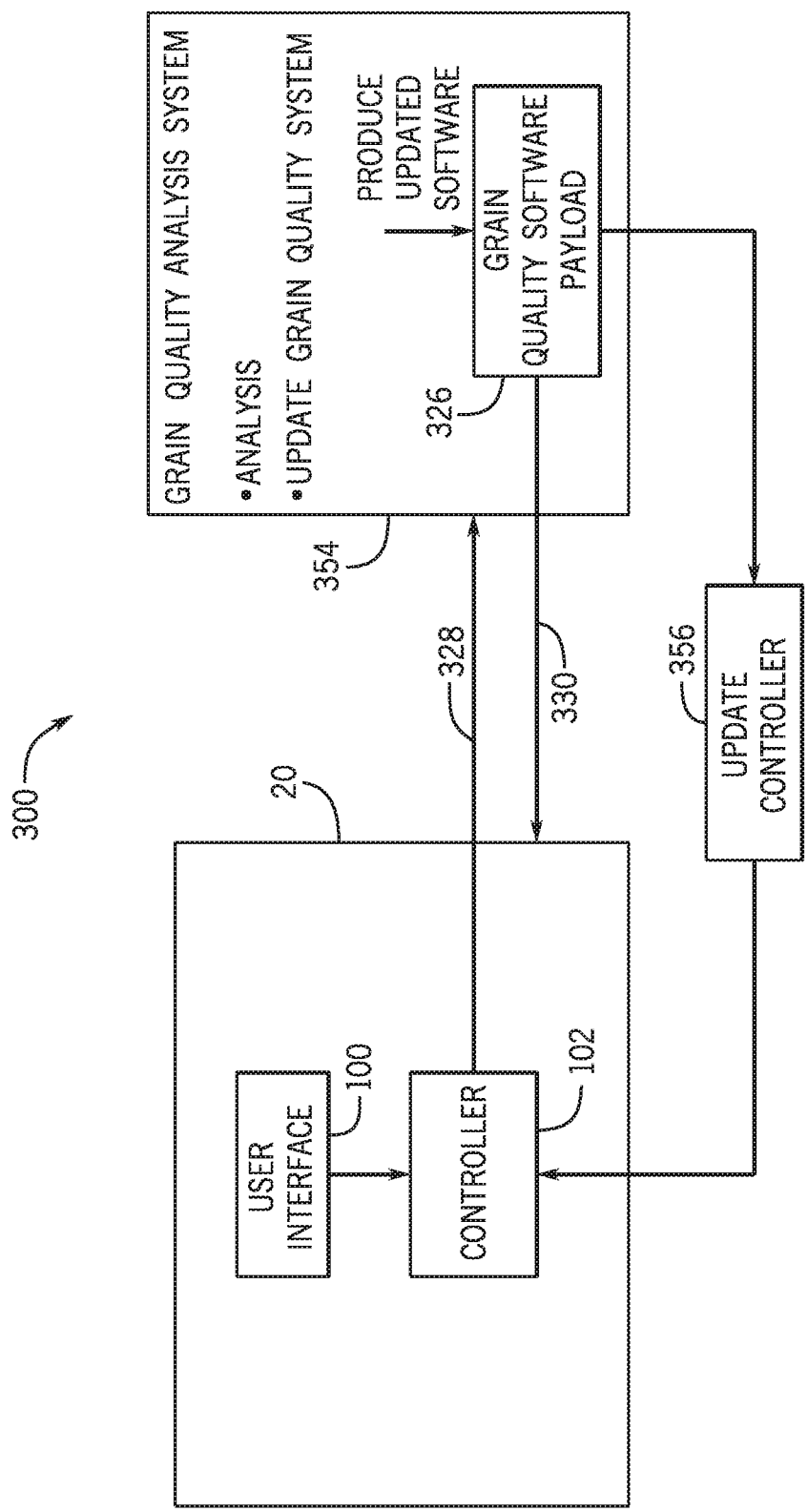

Referring to FIGS. 10 and 11, a remote connectivity system 300 for the combine harvester 20 includes a remote system 310 located at a remote location 302. Further included in the remote connectively system 300 is a remote system 304 and a data storage module 306. The combine harvester 20 communicates with elements in the server at the remote location 302. In one implementation, the remote systems 304, 310 can each provide computation, software, data access, and storage services that do not require end-user knowledge of the physical location or configuration that delivers the services. The remote systems 304, 310 can include one or more web-based or non-web-based servers and can deliver the services over a wide area network, such as the internet, using appropriate protocols, and can be accessed through a web browser or any other computing component. Software or components shown in FIGS. 6-9 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

The architecture of FIG. 10 contemplates that some elements of FIG. 1 are disposed at the remote locations 302 while others are not. By way of example, the data storage 306, and the remote systems 304, 310 can be disposed at a location separate from the location of the combine harvester 20 and accessed through remote servers. Regardless of where they are located, they can be accessed directly by the combine harvester 20 through a network. The remote systems 304, 310 can be hosted at a remote site by a service, or they can be provided as a service, or accessed by a connection service that resides in a remote location. The data storage 306 can be local or remotely located relative to the remote system 310 and/or the remote system 304. The data storage 306 may be shared by the remote systems 304, 310.

The remote connectivity system 300 can comprise a grain quality analysis system 354 and an update controller 356. In one implementation, the grain quality analysis system 354 is a remotely-located central system and the grain quality analysis system 354 and the update controller 356 are remotely located relative to the combine harvester 20. In one embodiment, the combine harvester 20 transmits images processed, or not, to the grain quality analysis system 354 for diagnostics or system update purposes through the channel 328. A software module 326 of the grain quality analysis system 354 can send back software updates or diagnostic information to the combine harvester 20 through the channel 330. For instance, the operator of the combine harvester 20 may have low confidence in the grain quality of the grain tailings. The combine harvester 20 transmits images of the seemingly-impaired grain tailings to the grain quality analysis system 354 for potential diagnosis. Alternatively, software or process updates to the combine harvester 20 can be initialed by the grain quality analysis system 354 and conveyed through the update controller 356 via a dedicated channel or a channel common to the channel 330. In one implementation, the grain quality analysis system 354 collects images suspected of lower quality and based on its diagnosis sends software or product-line updates through the update controller 356 to the combine harvester 20 to improve grain quality analysis. Alternatively, the grain quality analysis system 354 collects information from agricultural machines from more than one farm and upon analysis of the information, detects issues unique to the crops of a particular farm relative to crops of other farms or relative to a standard or expectation and grain quality analysis system 354 sends diagnostic or update information to the farm with the detected troubled crop for assistance. In another implementation, the grain quality analysis system 354 keeps software versions on various farms current by sending software updates either directly or through the update controller 356 to the agricultural machines of various farms.

In one implementation, the update controller 356 is communicatively coupled to more than one combine harvester for updating or diagnosis of the equipment of more than one farm. Alternatively, each farm may communicate to a central location, such as the grain quality analysis system 354, remotely through a distinct controller or a common controller, such as the update controller 356.

In one implementation, the channels 328 and 330 are one communication channel. They can be implemented by cellular channels, Wi-Fi, JDLINK, or any other suitable means of wireless communication. The update controller 356 can communicate with the combine harvester 20 and/or the grain quality analysis system 354 through similar wireless communications protocol. In one implementation, the update controller 356 is a part of the grain quality analysis system 354.

The grain quality analysis system 354 can, if necessary, remotely update the classification of the classifier algorithm or replace or update the classifier algorithm, of the combine harvester 20, as appropriate. Accordingly, the grain quality analysis system 354 allows further flexibility in classification, diagnosis and updating of agricultural machines, such as the combine harvester 20.

Remote transmission of image data by the combine harvester 20 to the grain quality analysis system 354 can lead to improvements in the confidence level of grain quality and/or identify features in the image that do not exist in the current image data set and are possibly unexpected. It can further allow agricultural machines to operate in a condition or with a crop that is not currently supported and/or allow an operator of a machine to indicate and report an issue.

Remote access to image data from the combine harvester 20 to the grain quality analysis system 354 and from the grain quality analysis system 354 to the combine harvester 20 can improve customer support, allowing analysis of system performance, improving system performance, and/or allowing for faster development of software updates to be distributed to multiple farms/customers through normal distribution processes or directly to a farm's agricultural machine(s).

The CNN algorithm, when executed by the processor 232, effectively performs semantic segmentation of the sample image on a pixel basis to provide classification outputs. Alternatively or additionally, the CNN algorithm, or separate imaging logic, may perform instance segmentation to measure the grain size of grain tailings of the tailings elevator 70 of the combine harvester 20, which can be useful for machine automation.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

Also, the following examples are provided, which are numbered for convenient reference, as follows.

1. A grain tailings elevator for a combine harvester comprising: an elevator housing having an interior containing a conveyor arrangement configured to transport grain tailings through the elevator housing to a discharge outlet, the elevator housing having a side wall with a window to the interior of the elevator housing; and a camera having a camera housing containing an image sensor, the camera housing being mounted to the side wall of the elevator housing over the window with the image sensor in registration with the window; wherein the image sensor is trained on the conveyor arrangement and configured to image the grain tailings transported by the conveyor arrangement through the elevator housing.

2. The tailings elevator of example 1, wherein the camera is mounted to the side wall of the elevator housing within a distance from a bottom end of the elevator housing approximately one quarter of a length of the elevator housing; and wherein a width of the window is equal to a width of the side wall.

3. The tailings elevator of example 1, wherein the conveyor arrangement includes a plurality of paddles coupled to a flexible member and spaced apart along a length of the elevator housing; and wherein each of the plurality of paddles has a front edge and a rear edge, the front edge being closer to the side wall of the elevator housing than the rear edge.

4. The tailings elevator of example 3, wherein the camera is trained on the conveyor arrangement so that the image sensor images the grain tailings carried by a top portion of the paddle between the front edge and the rear edge of each of the plurality of paddles as they move the grain tailings through the elevator housing to the discharge outlet; alternatively wherein the camera is trained on the conveyor arrangement so that the image sensor images the grain tailings in suspension within the elevator housing as the plurality of paddles move the grain tailings through the elevator housing to the discharge outlet.

5. The tailings elevator of example 3, wherein the camera is mounted at an angle with respect to the side wall of the elevator housing such that full lengths of the front and rear edges of each of the plurality of paddles falls within a field of view of the image sensor as the conveyor arrangement moves through the plurality of paddles through the elevator housing.

6. The tailings elevator of example 5, further including a sensor configured to sense the plurality of the paddles as they pass through the elevator housing; wherein the sensor is operatively coupled to the camera to activate the image sensor after sensing one of the plurality of paddles.

7. The tailings elevator of example 6, wherein the sensor is located adjacent to or within the camera housing; and wherein the sensor senses each of the plurality of paddles through the window in the side wall of the elevator housing.

8. An agriculture combine comprising: a clean grain elevator; and a grain tailings elevator including: an elevator housing having an interior containing a conveyor arrangement configured to transport partially threshed grain tailings through the elevator housing to a discharge outlet, the elevator housing having a side wall with a window to the interior of the elevator housing; and a camera having a camera housing containing an image sensor, the camera housing being mounted to the elevator housing over the window in the side wall with the image sensor in registration with the window; wherein the image sensor is trained on the conveyor arrangement and configured to image the grain tailings transported by the conveyor arrangement through the elevator housing.

9. The agriculture combine of example 8, wherein the camera is mounted to the elevator housing within a distance from a bottom end of the elevator housing approximately one third of a length of the elevator housing; and wherein a width of the window is equal to a width of the side wall.

10. The agriculture combine of example 8, wherein the conveyor arrangement includes a plurality of paddles coupled to a flexible member and spaced apart along a length of the elevator housing; and wherein each of the plurality of paddles has a front edge and a rear edge, the front edge being closer to the side wall of the elevator housing than the rear edge.

11. The agriculture combine of example 10, wherein the camera is trained on the conveyor arrangement so that the image sensor images the grain tailings carried by a top portion of the paddle between the front edge and the rear edge of each of the plurality of paddles as they move the grain tailings through the elevator housing to the discharge outlet, alternatively wherein the camera is trained on the conveyor arrangement so that the image sensor images the grain tailings in suspension within the elevator housing as the plurality of paddles move the grain tailings through the elevator housing to the discharge outlet.

12. The agriculture combine of example 10, wherein the camera is mounted at an angle with respect to the side wall of the elevator housing such that full lengths of the front and rear edges of each of the plurality of paddles falls within a field of view of the image sensor as the conveyor arrangement moves through the plurality of paddles through the elevator housing.

13. The agriculture combine of example 8, further including a control system including at least one processor and memory architecture for executing imaging commands; wherein the control system is operatively connected to the camera to control the image sensor.

14. The agriculture combine of example 13, further including a sensor operatively connected to the control system to provide sensor input to the at least one processor and configured to sense the plurality of the paddles as they pass through the elevator housing; wherein the control system activates the image sensor after sensing one of the plurality of paddles by the sensor.

15. The agriculture combine of example 14, wherein the sensor is located adjacent to or within the camera housing; and wherein the sensor senses each of the plurality of paddles through the window in the side wall of the elevator housing.

As will be appreciated by one skilled in the art, certain aspects of the disclosed subject matter may be embodied as a method, system (e.g., a work vehicle control system included in a work vehicle), or computer program product. Accordingly, certain embodiments may be implemented entirely as hardware, entirely as software (including firmware, resident software, micro-code, etc.) or as a combination of software and hardware (and other) aspects. Furthermore, certain embodiments may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that may contain, or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be non-transitory and may be any computer readable medium that is not a computer readable storage medium and that may communicate, propagate, or transport a program for use by or in connection with an instruction execution system, apparatus, or device.

Aspects of certain embodiments are described herein may be described with reference to flowchart illustrations and/or block diagrams of methods, apparatus (systems) and computer program products according to embodiments of the invention. It will be understood that each block of any such flowchart illustrations and/or block diagrams, and combinations of blocks in such flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any flowchart and block diagrams in the figures, or similar discussion above, may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block (or otherwise described herein) may occur out of the order noted in the figures. For example, two blocks shown in succession (or two operations described in succession) may, in fact, be executed substantially concurrently, or the blocks (or operations) may sometimes be executed in the reverse order, depending upon the functionality involved. It will also be noted that each block of any block diagram and/or flowchart illustration, and combinations of blocks in any block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various implementations other than those explicitly described are within the scope of the claims.

What is claimed is:

1. A grain tailings elevator for a combine harvester comprising:
    an elevator housing having an interior containing a conveyor arrangement configured to transport grain tailings through the elevator housing to a discharge outlet, the elevator housing having a side wall with a window to the interior of the elevator housing, wherein the conveyor arrangement includes a plurality of paddles coupled to a flexible member and spaced apart along a length of the elevator housing, each of the plurality of paddles has a front edge and a rear edge, the front edge being closer to the side wall of the elevator housing than the rear edge; and
    a camera having a camera housing containing an image sensor, the camera housing being mounted to the side wall of the elevator housing over the window with the image sensor in registration with the window and within a distance from a bottom end of the elevator housing approximately one quarter of a length of the elevator housing;
    wherein the camera is trained on the conveyor arrangement so that the image sensor images the grain tailings carried by a top portion of the paddle between the front edge and the rear edge of each of the plurality of paddles as they move the grain tailings through the elevator housing to the discharge outlet, and the image sensor is at a location other than an offload location where the grain tailings are offloaded from the conveyor arrangement.

2. The tailings elevator of example 1, wherein a width of the window is equal to a width of the side wall.

3. The tailings elevator of claim 1, wherein the camera is mounted at an angle with respect to the side wall of the elevator housing such that full lengths of the front and rear edges of each of the plurality of paddles falls within a field of view of the image sensor as the conveyor arrangement moves through the plurality of paddles through the elevator housing.

4. The tailings elevator of claim 1, wherein the camera is trained on the conveyor arrangement so that the image sensor images the grain tailings in suspension within the elevator housing as the plurality of paddles move the grain tailings through the elevator housing to the discharge outlet.

5. The tailings elevator of claim 1, further including a sensor configured to sense the plurality of the paddles as they pass through the elevator housing;
    wherein the sensor is operatively coupled to the camera to activate the image sensor after sensing one of the plurality of paddles.

6. The tailings elevator of example 5, wherein the sensor is located adjacent to or within the camera housing; and
    wherein the sensor senses each of the plurality of paddles through the window in the side wall of the elevator housing.

7. An agriculture combine comprising:
    a clean grain elevator; and
    a grain tailings elevator including:
    an elevator housing having an interior containing a conveyor arrangement configured to transport partially threshed grain tailings through the elevator housing to a discharge outlet, the elevator housing having a side wall with a window to the interior of the elevator housing, wherein the conveyor arrangement includes a plurality of paddles coupled to a flexible member and spaced apart along a length of the elevator housing each of the plurality of paddles has a front edge and a rear edge, the front edge being closer to the side wall of the elevator housing than the rear edge; and
    a camera having a camera housing containing an image sensor, the camera housing being mounted to the elevator housing over the window in the side wall with the image sensor in registration with the window and within a distance from a bottom end of the elevator housing approximately one quarter of a length of the elevator housing;
    wherein the camera is trained on the conveyor arrangement so that the image sensor images the grain tailings carried by a top portion of the paddle between the front edge and the rear edge of each of the plurality of paddles as they move the grain tailings through the elevator housing to the discharge outlet and the image sensor is at a location other than an offload location where the grain tailings are offloaded from the conveyor arrangement.

8. The agriculture combine of example 7, wherein a width of the window is equal to a width of the side wall.

9. The agriculture combine of claim 7, wherein the camera is mounted at an angle with respect to the side wall of the elevator housing such that full lengths of the front and rear edges of each of the plurality of paddles falls within a field of view of the image sensor as the conveyor arrangement moves through the plurality of paddles through the elevator housing.

10. The agriculture combine of claim 7, wherein the camera is trained on the conveyor arrangement so that the image sensor images the grain tailings in suspension within the elevator housing as the plurality of paddles move the grain tailings through the elevator housing to the discharge outlet.

11. The agriculture combine of claim 7, further including a control system including at least one processor and memory architecture for executing imaging commands; wherein the control system is operatively connected to the camera to control the image sensor.

12. The agriculture combine of example 11, further including a sensor operatively connected to the control system to provide sensor input to the at least one processor and configured to sense the plurality of the paddles as they pass through the elevator housing;

wherein the control system activates the image sensor after sensing one of the plurality of paddles by the sensor.

13. The agriculture combine of example 12, wherein the sensor is located adjacent to or within the camera housing; and wherein the sensor senses each of the plurality of paddles through the window in the side wall of the elevator housing.

14. The agriculture combine of example 11, wherein the control system is configured to store images captured by the image sensor into the memory and execute image processing algorithms to assess the content and quality of the grain tailings.

\* \* \* \* \*

UNITED STATES PATENT AND TRADEMARK OFFICE
CERTIFICATE OF CORRECTION

PATENT NO. : 11,818,982 B2
APPLICATION NO. : 16/540562
DATED : November 21, 2023
INVENTOR(S) : Stephen R. Corban et al.

It is certified that error appears in the above-identified patent and that said Letters Patent is hereby corrected as shown below:

In the Claims

In Column 23, Line 66, Claim 2, delete "example 1," and insert -- Claim 1, --, therefor.

In Column 24, Line 20, Claim 6, delete "example 5," and insert -- Claim 5, --, therefor.

In Column 24, Line 56, Claim 8, delete "example 7," and insert -- Claim 7, --, therefor.

In Column 25, Line 9, Claim 12, delete "example 11," and insert -- Claim 11, --, therefor.

In Column 25, Line 17, Claim 13, delete "example 12," and insert -- Claim 12, --, therefor.

In Column 25, Line 23, Claim 14, delete "example 11," and insert -- Claim 11, --, therefor.

Signed and Sealed this
Thirtieth Day of January, 2024

Katherine Kelly Vidal
*Director of the United States Patent and Trademark Office*